(12) United States Patent
Nagayasu

(10) Patent No.: US 7,782,295 B2
(45) Date of Patent: Aug. 24, 2010

(54) APPARATUS, METHOD AND RECORDING MEDIUM FOR EVALUATING TIME EFFICIENCY AND REAL-TIME NATURE OF POINTING DEVICE

(75) Inventor: Masafumi Nagayasu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1324 days.

(21) Appl. No.: 11/269,080

(22) Filed: Nov. 8, 2005

(65) Prior Publication Data

US 2006/0097995 A1    May 11, 2006

(30) Foreign Application Priority Data

Nov. 10, 2004  (JP) ............................ P2004-326793
Nov. 11, 2004  (JP) ............................ P2004-328153

(51) Int. Cl.
*G09G 5/00* (2006.01)
(52) U.S. Cl. .................... 345/156; 715/856; 715/858; 345/157
(58) Field of Classification Search ................ 345/156, 345/157; 715/856–858
See application file for complete search history.

(56) References Cited

U.S. PATENT DOCUMENTS 6,917,374 B2 *  7/2005  Ohide ........................ 347/131

FOREIGN PATENT DOCUMENTS

JP    10-63407    3/1998

OTHER PUBLICATIONS

Toshio Tsuji et al. EMG control type pointing device using the neural net, Society of Instrument and Control Engineers memoirs, Japan, Corporate judicial person Society of Instrument and Control Engineers, May 31, 2001, vol. 37, No. 5, p. 425-431.
Tetsuya Watanabe, Identification of the single graphic information with a tactile sense mouse, Institute of Image Information and Television Engineers magazine, Japanese Institute of Image Information and Television Engineers, Jun. 20, 2000, vol. 54, No. 6, p. 840-847.

* cited by examiner

Primary Examiner—Amare Mengistu
Assistant Examiner—Joseph G Rodriguez
(74) Attorney, Agent, or Firm—Frommer Lawrence & Haug LLP; William S. Frommer; Paul A. Levy

(57) ABSTRACT

An apparatus for evaluating a pointing device is provided in which time efficiency of a pointing device such as a mouse can be evaluated intuitively from a viewpoint of a user who uses a system.

The apparatus displays a trajectory of a pointer on a screen based on a movement of the pointer on the screen in accordance with data input from the pointing device, and evaluates the time efficiency of the pointing device based on whether the pointer has moved along a predetermined graphic as an index.

16 Claims, 16 Drawing Sheets

$x > y$
$x1 \neq x2 \neq x3$
$y1 \neq y2 \neq y3$
$\sqrt{(x2-x1)^2+(y2-y1)^2} > y/2$
$\sqrt{(x3-x2)^2+(y3-y2)^2} > y/2$
$\sqrt{(x1-x3)^2+(y1-y3)^2} > y/2$

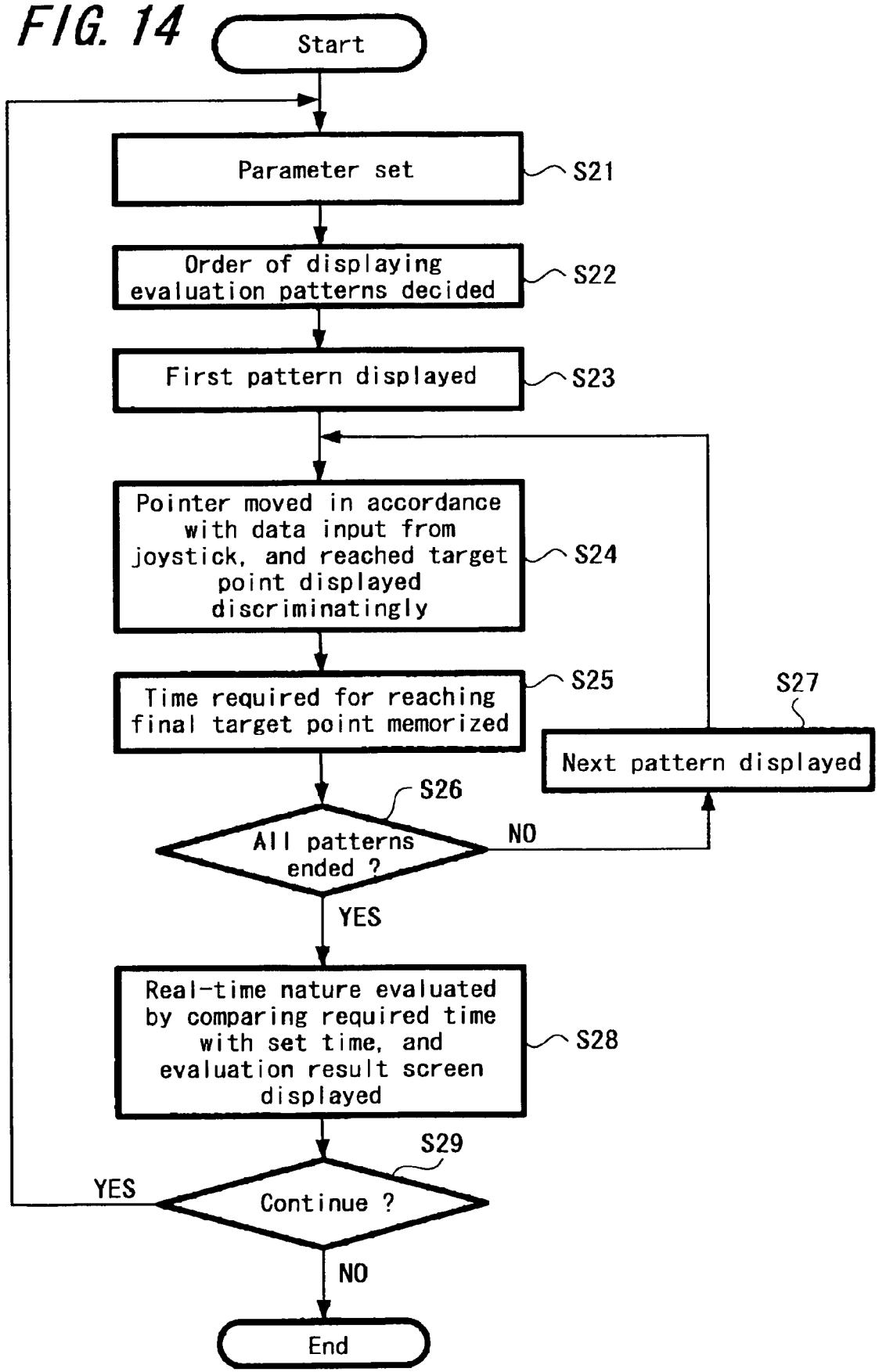

APPARATUS, METHOD AND RECORDING MEDIUM FOR EVALUATING TIME EFFICIENCY AND REAL-TIME NATURE OF POINTING DEVICE

CROSS REFERENCES TO RELATED APPLICATIONS

The present invention contains subject matter related to Japanese Patent Application JP 2004-326793 filed in the Japanese Patent Office on Nov. 10, 2004 and Japanese Patent Application JP 2004-328153 filed in the Japanese Patent Office on Nov. 11, 2004, the entire contents of which being incorporated herein by reference.

BACKGROUND OF THE INVENTION

1. Field of the Invention

The present invention relates to an apparatus, a method and the like to evaluate time efficiency of a pointing device intuitively from a viewpoint of a user who uses a system.

Further, the present invention relates to an apparatus, a method and the like for evaluating real-time nature of a system as a whole in a system in which data input from a pointing device having an operation unit to move a pointer in a plurality of directions such as a joystick, for example, is supplied through a transmission path of a predetermined protocol.

2. Description of the Related Art

In a personal computer, game equipment and the like, a pointing device (such as a mouse, for example) is widely used as an input device to specify an input position and coordinates on a screen.

From the past, a breadth of a range where a pointer can be moved by a given amount of operation, a resolution (minimum moving distance of a pointer), a speed with which a pointer follows data input from a pointing device and the like have been used as indices to indicate the performance of the pointing device itself. Those indices can also be the ones to show the operational performance of the pointer displayed on a screen when the pointing device is directly connected to a computer and the like.

However, in a system that uses a pointing device as an input device, a user confirms a movement result of a pointer on a screen while operating the pointing device, and determines whether to continue or to suspend the operation of the pointing device based on that movement result. Specifically, the following work is performed by feeding back the movement result of the pointer on the screen.

Then, in the system that uses the pointing device as the input device, the time efficiency of the work, that is, whether the user was able to perform efficiently enough the following work by feeding back the movement result of the pointer on the screen becomes important instead of the performance of the pointing device itself.

When existing indices of the pointing device itself are combined to perform evaluation, an evaluation criterion becomes complicated with respect to the time efficiency and a validity of the evaluation result becomes not easy to understand for anyone except a specialist in charge of the evaluation. In addition, it is difficult to express sufficiently whether the evaluated time efficiency is appropriate for a user who uses that system.

Particularly, in a system in which a transmission path of a specific communication protocol exists between a pointing device and a device that processes an input value thereof, and in a system in which a heavy load is constantly imposed on a CPU that processes an input value thereof, evaluation indices such as communication performance of the transmission path and a load factor of the CPU are required separately, and a know-how is needed in order to evaluate the time efficiency from all indices comprehensively.

On the other hand, an apparatus in which a coefficient indicating a characteristic of a pointing device is input as a parameter when calculating an operability index has been proposed in the past as the apparatus to evaluate an operability of a screen layout of a GUI that uses a pointing device, for example (refer to Published Japanese Patent Application No. H7-56730). However in this apparatus, evaluation is performed using time required for moving a pointer to a button of an operational object on a GUI screen as the operability index, which is not the evaluation of the time efficiency of whether the user was able to carry out efficiently enough the following work by feeding back the movement result of the pointer.

Besides, technology to evaluate the time efficiency of such pointing device has not been proposed in the past.

Next, there exists a joystick as a kind of pointing device. As is generally known, the joystick has an operation bar capable of being inclined in a plurality of directions (for example, four directions of up, down, left, right, or eight directions of up, down, left, right, and upper left, lower left, upper right, lower right that are inbetween thereof), and by inclining this operation bar a moving direction of a pointer on a screen is specified.

As a characteristic of this joystick, though it is easy to be operated in comparison to a mouse and the like, it is pointed out that the resolution is low (minimum moving distance of a pointer is large). Particularly, in the joystick inclining in eight directions, the resolution of the intermediate four directions is low in comparison to that of the four directions of up, down, left, right.

When a pointer is moved using the pointing device, typically a user confirms a movement result of the pointer on a screen while operating a pointing device and determines whether to continue or to suspend the operation of the pointing device based on the movement result.

Therefore, the pointer can be stopped at a position intended by the user in the case where the operation of the pointing device is reflected on real time in a screen display, however, in other cases, the pointer tends to move beyond the position intended by the user.

Further, since the resolution is low in case of the joystick as described above, in the case where the operation is not reflected on real time in the screen display, the pointer moves far beyond the position intended by the user.

Therefore, in a system that uses the joystick as the input device, it is important whether "real-time nature" exists or not, that is, whether the operation of the joystick is reflected on real time in the screen display.

For example, the apparatus proposed in the above-described Published Japanese Patent Application No. H7-56730 is the one that evaluates the time required for moving the pointer to the button of the operational object on the GUI screen as the operability index, and is not the one that evaluates whether the operation of the pointing device is reflected on real time in the screen display.

Besides, technology to evaluate the real-time nature of the image display with respect to such joystick has not been proposed.

Hereupon, as the system that uses a joystick as the input device, there also exists such a system in which data input from a joystick is supplied to a personal computer, game equipment and the like through a transmission path of a specific protocol as well as a system in which data input from a joystick is sent directly to a personal computer, game equipment and the like.

Further, in the latter system, the real-time nature of the screen display receives more influence from the communication performance in the transmission path rather than the performance of the joystick itself. Accordingly, in the latter system, it is necessary that this real-time nature can be evaluated as the whole system including the transmission path.

SUMMARY OF THE INVENTION

In view of the problems described above, first the present invention aims to evaluate intuitively the time efficiency of a pointing device from a viewpoint of a user who uses a system in the system that uses a pointing device as an input device.

Further, particularly in a system that uses a pointing device such as a joystick which has an operation unit to move a pointer in a plurality of directions as an input device, the present invention secondly aims to evaluate the real-time nature of a screen display from a viewpoint of whether this real-time nature is sufficient when a user uses the system.

An apparatus for evaluating the time efficiency of a pointing device according to an embodiment of the present invention includes: image display means, processing means to display a graphic made of at least two line segments not parallel to each other on a screen of the image display means, and evaluation means to display a trajectory of a pointer on the screen based on a movement of the pointer on the screen in accordance with data input from the pointing device and to evaluate using whether the pointer has moved along each side of the graphic as an index.

Further, a method for evaluating the real-time nature of a pointing device according to an embodiment of the present invention includes: a first step of displaying a graphic made of at least two line segments not parallel to each other on a screen of image display means and a second step of displaying a trajectory of a pointer on the screen based on a movement of the pointer on the screen in accordance with data input from the pointing device and performing evaluation using whether the pointer has moved along each side of the graphic as an index.

Further, a computer readable recording medium according to an embodiment of the present invention is the one in which a program is recorded to make a computer execute: a procedure of displaying a graphic made of at least two line segments not parallel to each other on a screen of image display means and a procedure of displaying a trajectory of a pointer on the screen based on a movement of the pointer on the screen in accordance with data input from a pointing device and performing evaluation using whether the pointer has moved along each side of this graphic as an index.

According to the embodiments of the present invention, a graphic made of at least two line segments not parallel to each other is displayed on the screen of image display means.

When the user operates the pointing device such that the pointer is moved along each side of this displayed graphic, the trajectory of the pointer is displayed on the screen in accordance with that operation. The user can easily confirm whether the pointer accurately moves along each side of the graphic (whether or not the pointer moves off this graphic) by observing the trajectory. Then, the time efficiency is evaluated based on whether the pointer has accurately moved along each side of the graphic as the index.

Thus, according to the embodiments of the present invention, the time efficiency of the pointing device is evaluated based on whether the user was able to move the pointer accurately along the displayed graphic (specifically, whether the same graphic as the displayed graphic could be drawn) as the index.

Accordingly, in a system that uses the pointing device as the input device (particularly, in a system requiring a know-how in order to do a evaluation from existing indices such as a system in which a transmission path of a specific communication protocol exists between a pointing device and a device that processes the input value thereof and a system in which a heavy load is constantly imposed on a CPU that processes the input value thereof), the time efficiency of the pointing device can be evaluated intuitively from a viewpoint of a user who uses the system.

Further, since only a simple graphic made of line segments needs to be drawn, a difference in an evaluation result is rarely occurs between a case in which an operation is performed by a user skilled in the operation of the pointing device and a case in which the operation is performed by a user not skilled in the operation. Therefore, evaluation can be performed almost without receiving an influence of an individual difference in such skillfulness.

Here, as an example, it is preferable that a graphic made of a line segment that is not parallel to the horizontal direction and to the vertical direction of the screen is displayed as the above graphic. Since it is comparatively easy to operate the pointing device such that a line segment parallel to the horizontal direction and vertical direction of the screen is traced with a pointer without a feed back of a movement result of the pointer on a screen, the time efficiency may not be evaluated under an actual mode of using a pointing device, in which "the following work is performed by feeding back the movement result of the pointer on the screen". On the other hand, when a line segment not parallel to the horizontal direction and vertical direction of the screen is displayed, the time efficiency can be evaluated under the actual mode of using the pointing device, in which "the following work is performed by feeding back the movement result of the pointer on the screen".

Further, it is preferable to display a graphic made of a line segment of 3-dot width or more as the graphic. In the case where the width of the line segment is one dot, since the pointer moves off the displayed graphic at the exact moment when the user is about to correct the moving direction of the pointer after confirming that the pointer is shifted toward the direction vertical to the line segment, the evaluation result becomes deteriorated. In this case, the time efficiency may not be evaluated under the actual mode of using the pointing device, in which "the following work is performed by feeding back the movement result of the pointer on the screen". On the other hand, in the case where the width of the line segment is three dots or more, the user can correct the moving direction of the pointer after confirming that the pointer is shifted toward the edge of the line segment while tracing the center of the line segment with the pointer. Accordingly, the time efficiency can be evaluated under the actual mode of using the pointing device, in which "the following work is performed by feeding back the movement result of the pointer on the screen".

In addition, it is preferable to display a graphic that has at least one corner as this graphic. In order to draw a corner portion, it is necessary to change the moving direction of the pointer from a direction parallel to one side out of two sides forming the angle into a direction parallel to the remaining side; in the case where the time efficiency of the pointing device is not excellent, the direction of the pointer tends to change at a point passing straight through the corner portion since there is a delay in the movement of the pointer on the screen against the operation of the pointing device. Accordingly, since whether the pointer has moved accurately along the displayed graphic can be judged clearly at the corner portion by displaying the graphic having the corner, the time efficiency of the pointing device can be evaluated more accurately.

In addition, although a graphic (V-shaped graphic) made of line segments of, for example, two sides forming one angle may be displayed as the graphic having the corner as described above, it is preferable to display a polygon. On determining any one of angles as a start point of movement of the pointer in case that the polygon is displayed, there is no need to specifically display an end point, because the same angle becomes the end point of the pointer. Furthermore, an evaluation method at the end point can be common to the evaluation method at other corners (evaluation is done based on whether or not the pointer passes straight through the corner portion).

Moreover, it is preferable to display in particular a triangle among polygons. In the polygon, the more the number of sides are, the closer to a circle the shape becomes, however, whether or not a curved line like the circle is drawn accurately is also affected by the resolution that is the performance of the pointing device itself. Therefore, in the case of a polygon having a large number of sides, a model of the pointing device to be an evaluation object is limited in terms of the resolution. Further, since the drawing of the curved line increases the user's operation more than necessary, there is a high possibility of generating an individual difference in an evaluation result. Therefore, with the triangle having the least number of sides among the polygons being displayed, the evaluation can be done regardless of the resolution of the pointing device while minimizing the user's operation.

In addition, in the case where the triangle is displayed, it is preferable that a length of each side is at least approximately one half the longitudinal size of the screen.

A moving area of the pointer on the screen differs depending on an individual system, however the smaller the area where the user draws is, the lower the requirement for the time efficiency becomes in any system. Conversely, the necessity to evaluate the time efficiency of the pointing device in the system is higher when the drawing area is large to a certain extent. Then, since the user needs to draw a large triangle to a certain extent by making the length of each side of the displayed triangle into at least approximately one half the longitudinal size of the screen, the evaluation can be done by reproducing a state where the requirement for the time efficiency is high in the system.

Next, an apparatus for evaluating the real-time nature of a pointing device according to an embodiment of the present invention includes: image display means, processing means to display a target point disposed correspondingly to a direction of a pointer moved by the pointing device having an operation unit to move the pointer in a plurality of directions on a screen of the image display means, and evaluation means to evaluate using time required for reaching the target point as an index based on the fact that the pointer has reached the target point on the screen in accordance with data input from the pointing device.

Further, an method for evaluating the real-time nature of a pointing device according to an embodiment of the present invention includes: a first step of displaying a target point disposed correspondingly to a direction of a pointer moved by a pointing device having an operation unit to move the pointer in a plurality of directions on a screen of image display means, and a second step of performing evaluation using time required for reaching the target point as an index based on the fact that the pointer has reached the target point on the screen in accordance with data input from the pointing device.

Further, a computer readable recording medium according to an embodiment of the present invention is the one in which a program is recorded to make a computer execute: a procedure of displaying a target point disposed correspondingly to a direction of a pointer moved by a pointing device having an operation unit to move the pointer in a plurality of directions on a screen of image display means, and a procedure of performing evaluation using time required for reaching the target point as an index based on the fact that the pointer has reached the target point on the screen in accordance with data input from the pointing device.

In the embodiment of the present invention, the target point disposed correspondingly to the direction of a pointer moved by the pointing device (for example, a joystick) having the operation unit to move the pointer in a plurality of directions is displayed on the screen of the image display means.

A necessary work for the user to do is only operating the pointing device to make the pointer reach the target point on the screen. Further, when the pointer reaches the target point on the screen in accordance with this operation, the real-time nature is evaluated by using the time required for reaching the target point as the index.

Thus, according to the embodiments of the present invention, the real-time nature of the screen display in the case where the input data is supplied from the pointing device such as the joystick is evaluated using the time required for reaching the target point disposed correspondingly to the moving direction of the pointer as the sole index.

Accordingly, in the system in which the data input from the pointing device such as the joystick is supplied through the transmission path of the predetermined protocol, the real-time nature of the screen display can be evaluated intuitively and easily from the viewpoint of whether to be sufficient when the user uses that system.

Particularly, in the system in which the data input from the pointing device such as the joystick is supplied through the transmission path of the predetermined protocol, the real-time nature of the screen display can be evaluated as a whole system including the transmission path.

Here, in the case where the pointing device is the one that has the operation unit to move the pointer in eight directions of up, down, left, right, upper left, lower left, upper right, and lower right, it is preferable as an example that four target points in total, that is, one target point disposed in the up and down direction, one target point disposed in the left and right direction, one target point disposed in a direction connecting the upper left and lower right, and one target point disposed in a direction connecting the upper right and lower left are disposed and displayed on the screen such that a position of a final target point to a start point of movement of the pointer becomes any position among those toward the lower right, toward the lower left, toward the upper right, and toward the upper left on the screen.

The direction of a pointer moved by the pointing device in the eight directions can be represented by those four target points. In addition, the position of the point intended by the user can be represented by four positions of one toward the lower right, one toward the lower left, one toward the upper right, and one toward the upper left on the screen to the start point of movement of the pointer in the actual state of using the pointing device. Therefore, by disposing and displaying those four target points as described above, a pattern of the target points disposed can be narrowed down to the minimum patterns that represent both the direction of a pointer moved by the pointing device and the actual status of using the pointing device. Accordingly, the real-time nature can be evaluated efficiently.

Further, it is preferable as an example to display the pattern such that a distance to each target point becomes equal to each other. With this, the real-time nature can be evaluated equally with respect to all the directions of a pointer moved by the pointing device.

Further, it is preferable as an example to further include processing means to display discriminatingly the reached target point from a target point to be reached whenever the pointer reaches each target point. With this, the user can confirm visually and easily during the evaluation operation that the pointer has reached each target point.

According to the embodiments of the apparatus, method, and recording medium for evaluating the time efficiency of the pointing device of the present invention, such effectiveness that the time efficiency of the pointing device is evaluated intuitively from the viewpoint of the user who uses the system and is evaluated almost without receiving the influence of the individual difference in the skillfulness of the operation of the pointing device can be obtained in the system that uses the pointing device as the input device (particularly, in the system that requires know-how to perform evaluation using existing index, such as the system in which the transmission path of the specific protocol exists between the pointing device and the apparatus that processes the input value thereof and the system in which the heavy load is constantly imposed on the CPU that processes the input value thereof).

Further, such effectiveness can also be obtained that the evaluation is done under the actual mode of using the pointing device, in which "the following work is performed by feeding back the movement result of the pointer on the screen" by displaying the graphic made of the line segments not parallel to the horizontal direction and vertical direction of the screen and by displaying the graphic made of the line segments of the 3-dot width or more.

Further, since whether the pointer has moved accurately along the displayed graphic is judged clearly at the corner portion by displaying the graphic having the corner, such effectiveness can also be obtained that the evaluation is done more accurately.

In addition, such effectiveness can be obtained that with displaying the polygon, there is no need to specifically display the end point of the pointer and the evaluation method at the end point is shared with the evaluation method at the other angle.

Moreover, such effectiveness can be obtained that with displaying the triangle, the evaluation is done independently from the resolution of the pointing device and with minimizing the user's operation.

Further, such effectiveness can be obtained that with displaying the triangle whose each side has the length of at least approximately one half the longitudinal size of the screen, the evaluation is done by reproducing the state where the requirement for the time efficiency is high in the system.

Next, according to the embodiments of the apparatus, method, and recording medium for evaluating the real-time nature of the pointing device of the present invention, such effectiveness can be obtained that in the system in which the data input from the pointing device (for example, joystick) having the operation unit to move the pointer in the direction such as the up and down direction, and the left and right direction is supplied, the real-time nature of the screen display can be evaluated intuitively and easily from the viewpoint of whether to be sufficient when the user uses the system.

Moreover, particularly in the system in which the data input from such pointing device is supplied through the transmission path of the predetermined protocol, such effectiveness can be obtained that the real-time nature of the screen display is evaluated as the whole system including the transmission path.

In addition, such effectiveness can also be obtained that such evaluation of the real-time nature is efficiently done. Moreover, such effectiveness can also be obtained that the real-time nature for all the directions of a pointer moved by the pointing device is evenly evaluated. Further, such effectiveness can also be obtained that the user can confirm visually and easily during the evaluation work that the pointer has reached each target point.

BRIEF DESCRIPTION OF THE DRAWINGS

FIG. 14 is a flow chart showing contents of processing by a real-time nature evaluation program;

DESCRIPTION OF THE PREFERRED EMBODIMENTS

Hereinafter, embodiments of the present invention are specifically explained by referring to the accompanied drawings.

[Evaluation of Time Efficiency of Pointing Device]

First, an apparatus, method, program, and recording medium for evaluating time efficiency of a pointing device related to an embodiment of the present invention is explained.

<<Example of System Configuration>>

Figure 1:
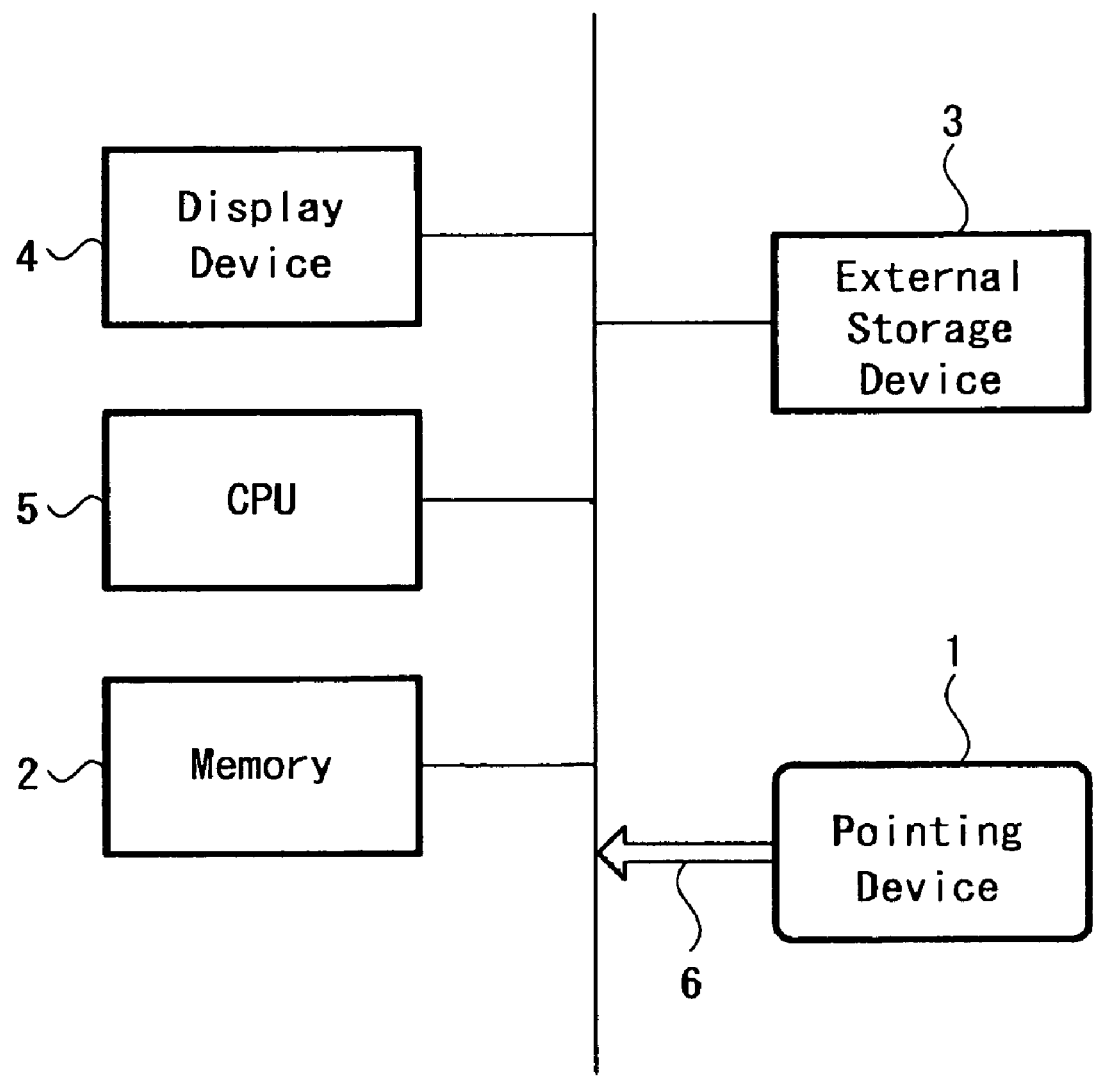
FIG. 1 is a block diagram showing an example of a configuration of a system according to an embodiment of the present invention.
Figure 2:
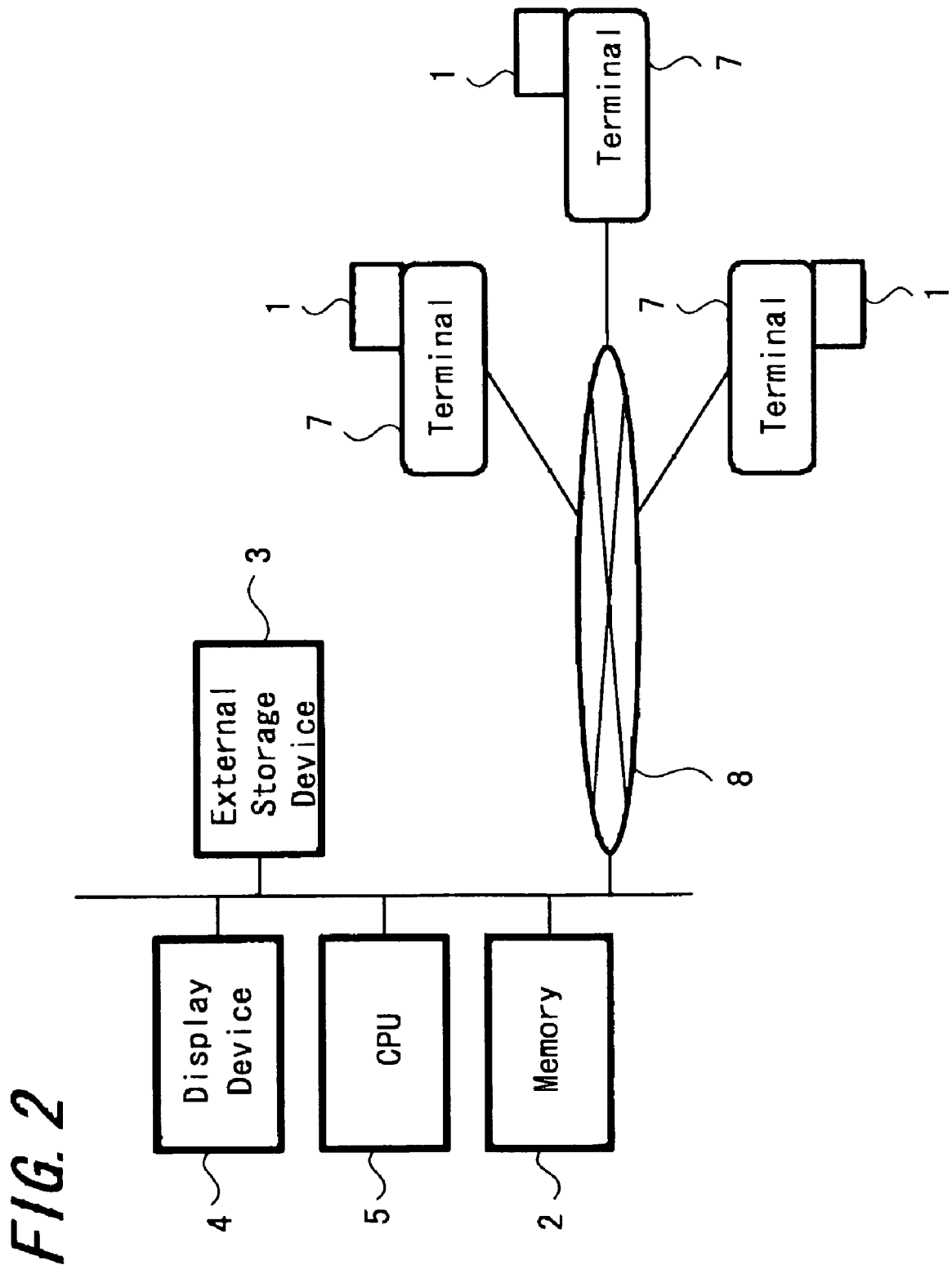
FIG. 2 is a block diagram showing another example of a configuration a system according to an embodiment of the present invention.
Figure 3:
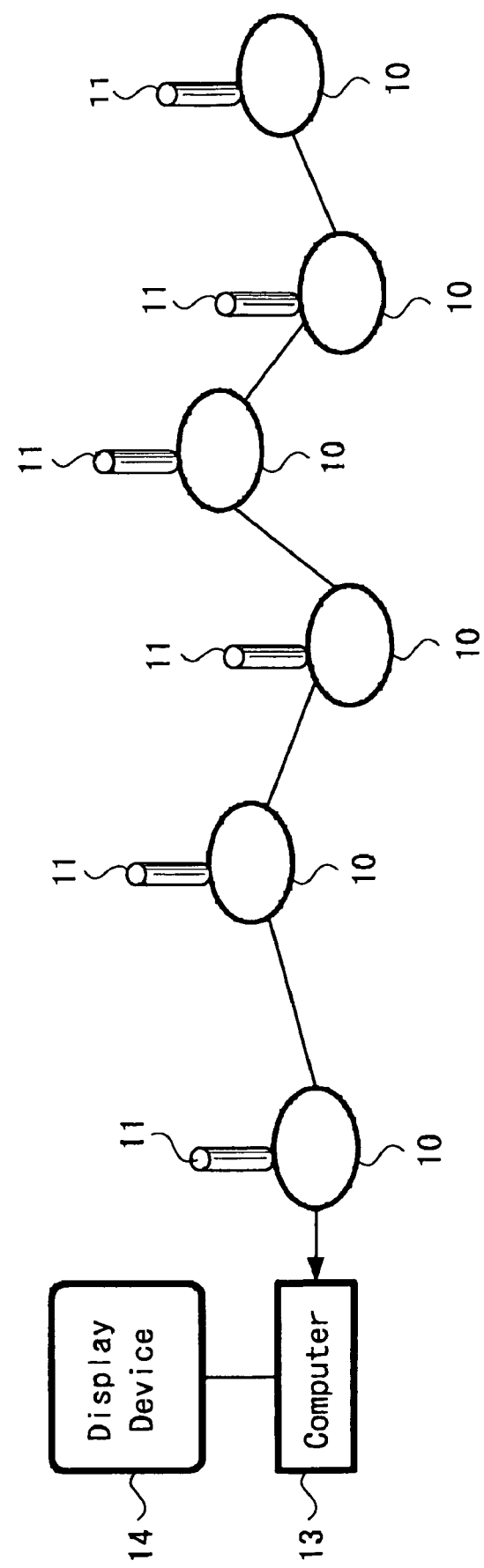
FIG. 3 is a block diagram showing further another example of a configuration of a system according to an embodiment of the present invention.

First, a system is explained to which an apparatus, method, program, and recording medium for evaluating time efficiency of a pointing device according to an embodiment of the present invention are applied. FIG. 1 is a block diagram showing an example of a configuration of a system to which the present invention is applied. Further, FIG. 2 is a block diagram showing another example of a configuration of a system to which the present invention is applied. Furthermore, FIG. 3 is a block diagram showing further another example of a configuration of a system to which the present invention is applied.

In the system of FIG. 1, a transmission path (for example, USB) 6 to transmit data input from a pointing device 1 (a mouse, a joystick and the like, for example) is directly connected to a memory 2 and a CPU 5. A display device 4 and an external storage device 3 (for example, HDD) are respectively connected to the memory 2 and the CPU 5. Those memory 2, CPU 5, display device 4, and external storage device 3 may constitute a single apparatus (for example, a computer including a built-in HDD and monitor) or may constitute two or more apparatuses (for example, a computer including a built-in HDD, and a projector of a large screen).

In the external storage device 3 is stored "an evaluation program" for a time efficiency evaluation whose processing contents are described later on as well as an application software necessary for original use of a system and a device driver of the pointing device. This evaluation program may be installed from a recording medium such as a CD-ROM, or may also be downloaded from a Web site to be installed. The program in the external storage device 3 is loaded on the memory 2.

Data input from the pointing device 1 is sent to the device driver loaded on the memory 2. The device driver operates the received input data by using the CPU 5 to be converted into coordinate data for the display device 4. The evaluation program loaded on the memory 2 obtains the coordinate data directly from this device driver, or obtains by reading the coordinate data from a shared area after the device driver retains the coordinate data in the shared area on the memory 2.

Only one pointing device 1 is illustrated in FIG. 1, however, in the case where the device driver is capable of identifying a plurality of pointing devices, the plurality of pointing devices are connected and data input from each pointing device is converted into the coordinate data by the device driver to be obtained by the evaluation program.

In systems shown in FIGS. 2 and 3, a plurality of users can specify input positions and coordinates on a screen of a display device used in common by operating a pointing device exclusively used by each of the users. As specific examples of such system, a conference system in which participants of a conference make presentations on a screen of a common display device by operating individually a pointing device at one's own hand, or a game system in which a plurality of participants in a game make the game proceed on a screen of a common display device by operating individually a pointing device at one's own hand, and the like can be listed.

Among those systems, in the system of FIG. 2 a network 8 (for example, LAN) is interposed in a portion corresponding to the transmission path 6 of the system in FIG. 1, and the same reference numerals are given to those portions which are common to FIG. 1. A terminal 7 (a computer, or a dedicated device) that uses the pointing device 1 as the input device is provided for each user, and those terminals 7 are connected to the network 8. The memory 2 and CPU 5 are also connected to the network 8.

In the external storage device 3 is stored an external network driver in addition to the application software (a software for presentation, a game software and the like), device driver, and evaluation program.

The data input from each pointing device 1 is transmitted from the corresponding terminal 7 through the network 8 by means of a predetermined protocol (for example, TCP/IP), and is sent to the external network driver loaded on the memory 2. The external network driver sends the received input data to the device driver.

On the other hand, in the system of FIG. 3, a terminal 10 that uses a pointing device 11 (for example, a mouse, a joystick, and the like) as an input device is also provided for each user. However, a transmission path having a transmission bandwidth for one device is shared by those terminals 10 and data input from each pointing device 11 is transmitted to the terminal 10 located on the downstream side (left side in the figure) with respect to the corresponding terminal 10. As a protocol of this transmission path, UART (Universal Asynchronous Receiver Transmitter) that is one of asynchronous transmission technologies is used, for example.

Each terminal 10 has a function of deciding a priority such that the priority is given to a terminal 10 located on the upstream side (on the right side in the figure) on the transmission path, for example, and data input from the pointing device 11 of the terminal 10 having the highest priority among data input from respective pointing devices 11 is transmitted to the most downstream terminal 10.

Figure 4:
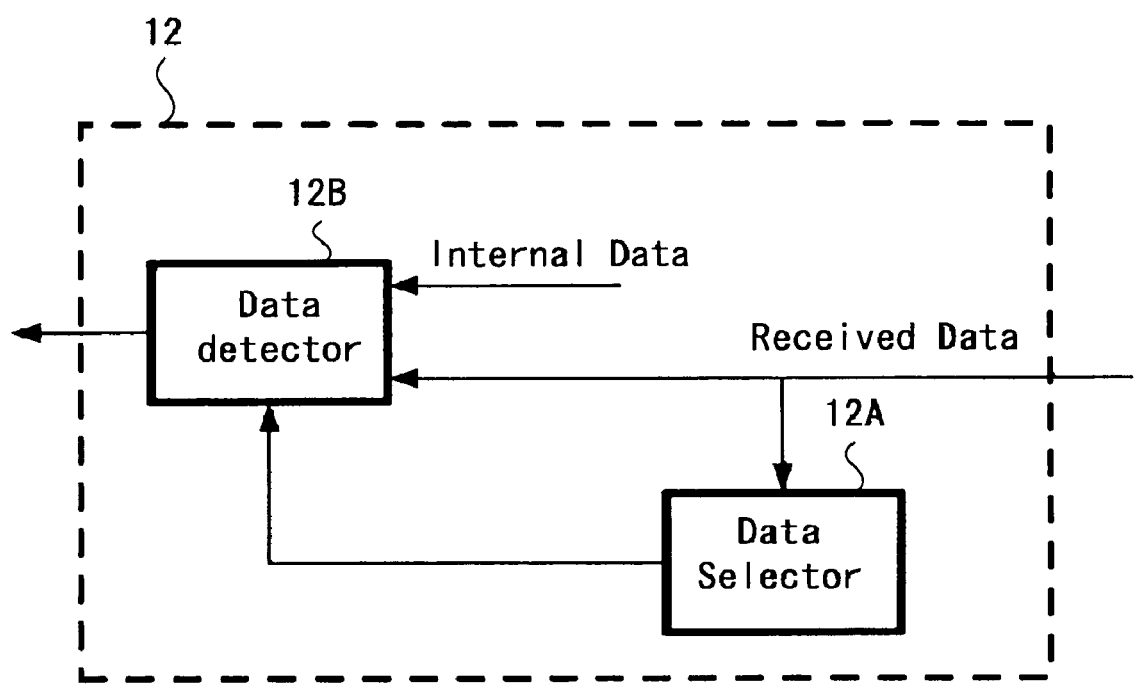
FIG. 4 is a block diagram showing a configuration of a data processor in a terminal shown in FIG. 3.

In order to perform this function of deciding a priority, a data processor 12 having such a configuration as shown in FIG. 4 is incorporated in each terminal 10. This data processor 12 includes a data detector 12A and a data selector 12B.

The data detector 12A detects whether significant data (data input from the pointing device 11 is one of the significant data) is received from another terminal 10 located on the upstream side thereof.

The data selector 12B transfers the significant data without any change to the terminal 10 on the downstream side when the reception of the significant data is detected by the data detector 12A, and outputs significant data generated in the terminal 10 of its own to the terminal 10 on the downstream side when the reception of the significant data is not detected by the data detector 12A.

The significant data is sent from the most downstream terminal 10 to a computer 13 in FIG. 3. The application software necessary for the original use of the system, the device driver, the above-described evaluation program are stored in a built-in HDD of the computer 13.

The data input from the pointing device 11 among the significant data sent from the most downstream terminal 10 is sent to the evaluation program loaded on a memory in the computer 13. The evaluation program operates the received input data by using a CPU in the computer 13 to be converted into coordinate data of a display device (monitor) 14, which is sent to the device driver.

According to the system of FIG. 3, necessary significant data can be collected in the most downstream terminal 10 with the minimum transmission bandwidth (data transmission amount) even in the case where a large number of terminals 10 are connected. Therefore, a data speed (resultant data amount obtained by a unit time) can be made irrelevant to the number of terminals. An application for patent of the data transmission system shown in FIG. 3 has already been made by the applicants of the present invention (Application Number: Japanese Patent Application 2003-345616).

It should be noted that the systems shown in FIGS. 1 through 3 are illustrated as examples and the apparatus, method, program and the recording medium for evaluating the time efficiency of the pointing device according to the embodiment of the present invention can be applied to all systems that use a pointing device as an input device.

<Basic Policy for Evaluating Time Efficiency of Pointing Device>

Next, an explanation is made to a basic policy for evaluating the time efficiency of the pointing device in the above-described evaluation program.

1. Evaluation by Drawing Graphics

Data input by the pointing device moves a pointer on a screen and the following operation is determined by feeding back the movement, and thereby a user performs an input by a pointing device. The time efficiency of this work depends on time until the data input from the pointing device is converted into a coordinate value of a display device (hereinafter, called real-time nature) and a sampling accuracy of the input data. However, if those measured values are shown, a judgment whether those values are appropriate to the user depends mostly on empirical data, and also it is not clear a level of efficiency that is required.

Then, as a work to intuitively measure the real-time nature and sampling accuracy from a viewpoint of a user, drawing is performed as tracing a graphic displayed in the display device. This work is made by displaying a trajectory of the pointer when the user moves the pointer by the pointing device while viewing the graphic on the screen and by determining the next movement of the pointer by the user based on a difference between the displayed graphic and the trajectory of the pointer. This is none other than realization of the input work using the pointing device.

2. Selection of Graphic to be Drawn

It is necessary to pay attention to the following points of (1) and (2) in order for the user to perform the work by feeding back the displayed graphic and a result of drawing by the pointing device.

(1) Since drawing a line segment that is parallel to the horizontal direction (left and right direction) and vertical direction (up and down direction) on the screen of the display device can be done comparatively easily without feeding back the movement result of the pointer on the screen, the time efficiency may not be evaluated in the actual mode of using the pointing device in which "the following work is performed by feeding back the movement result of the pointer on the screen". On the other hand, when drawing a line segment that is not parallel to the horizontal direction and vertical direction on the screen, the time efficiency can be evaluated in the actual mode of using the pointing device in which "the following work is performed by feeding back the movement result of the pointer on the screen"

(2) Whether a curved line is drawn accurately or not also depends on the resolution that is the performance of the pointing device itself. Therefore, a model of the pointing device to be evaluated is limited due to the resolution in case of drawing the curved line. Moreover, since the drawing of the curved line increases the user's operation more than necessary, there is a high possibility of generating an individual difference in an evaluation result.

As a result, it is necessary that the graphic to be drawn is made by the line segment that is not parallel to the horizontal direction and vertical direction on the screen of the display device. Further, it is desirable that the graphic is a polygon due to the following reasons of (3) and (4).

(3) In the case where the real-time nature or sampling accuracy is not sufficient, a motion of the pointer on the screen delays against the operation of the pointing device when performing a work to change the moving direction of the pointer to a direction of another straight line that is not parallel to a straight line under the drawing, and thereby the moving direction of the pointer changes at a point passing straight through a point where the user intended to change the moving direction.

Since the work to change the moving direction of the pointer in this manner at the corner portion (to change from a direction parallel with one side out of two sides constituting the corner to a direction parallel with the other side) is necessary in the case of drawing the graphic having the corners such as a polygon, the direction of the pointer changes at the point passing straight through the corner portion unless the real-time nature or sampling accuracy is sufficient. Accordingly, whether the pointer has moved accurately or not along the displayed graphic can be judged clearly at the corner portion by drawing the graphic having the corners such as a polygon, and therefore the time efficiency of the pointing device can be evaluated accurately.

(4) In the case of particularly drawing a polygon among graphics having a corner, there is no need to specifically show to the user on the screen which is an end point as long as one corner of the polygon is determined as a start point of movement of the pointer, because the corner also becomes the end point of the movement of the pointer. Furthermore, the same evaluation method employed at other corners (evaluation is done based on whether or not the pointer passes straight through the corner portion) can also be used at the end point.

Here, when the number of sides increases in a polygon, the shape thereof becomes closer to a circle. Therefore, in the case of drawing a polygon having a large number of sides, there occurs a similar problem to the case of drawing a curved line as described in the above (2).

On the other hand, when drawing a triangle that has the least number of sides among polygons, the evaluation can be done independently of the resolution of the pointing device with minimizing the user's operation.

Accordingly, as a graphic to be drawn, the triangle made by line segments that are not parallel to the horizontal direction and vertical direction on the screen of the display device is employed in the evaluation program.

However, similarly to the case of the triangle, the evaluation can be done with other polygons than the triangle as long as the number of sides is small such as a quadrangle, for example.

In addition, the similar evaluation result to the case of a polygon can be obtained using a graphic that has a corner but is not a polygon, which is a graphic made of line segments of two sides forming one corner (v-shaped graphic), for example, as long as the end point is displayed on the screen and an evaluation method is defined that the end point falls within a radius of n-dots from the end point, for example.

3. Evaluation Index

The triangle displayed in the display device is traced accurately with the pointer, and whether or not the same triangle can be drawn is measured. At this time, in the case where a width of the line segment constituting the triangle is one dot, the evaluation result becomes deteriorated, because the pointer has already moved off the displayed triangle at the moment when the user tries to correct the moving direction of the pointer as soon as it is confirmed that the pointer has shifted in the direction vertical to the line segment. In that case, the time efficiency may not be evaluated in the actual mode of using the pointing device in which "the following work is performed by feeding back the movement result of the pointer on the screen".

On the other hand, in the case where the width of the line segment constituting the triangle is three dots or more, the user can correct the moving direction of the pointer when it is confirmed that the pointer has shifted toward the edge of the line segment while tracing the center of the line segment with the pointer. Accordingly, the time efficiency can be evaluated in the actual mode of using the pointing device in which "the following work is performed by feeding back the movement result of the pointer on the screen".

Then, the width of the line segment constituting the triangle is made to be three dots or more, and it is confirmed whether or not the triangle can be drawn within the range of that width. Therefore, "whether a triangle of an n-dot width (n is an integer of three or more) can be drawn" becomes the evaluation index.

Here, there is such an idea that a triangle made of line segments of a 1-dot width is displayed and a ratio of a circumferential length of the triangle to a circumferential length of the graphic drawn by the user is made to be the evaluation index, however, since there occurs in that case a problem of difficulty in judging the ratio to be sufficient for evaluating the time efficiency (the same problem as in the case in which the evaluation is done by combining the existing indices of the pointing device itself as described in related art), this index may not be suitable.

If the width is given to the line segment as described above, the moving direction of the pointer can further be corrected without moving off the displayed triangle after the moving direction of the pointer is once changed when drawing the corner portion of the triangle. Therefore, even if the motion of the pointer on the screen is slightly delayed compared with the operation of the pointing device, the same triangle as the displayed triangle can be drawn.

However, in the case where the same triangle as the displayed triangle can be drawn, it can be said that the time efficiency is higher in the case where the moving direction of the pointer is not corrected, compared with the case where the moving direction of the pointer is corrected at the corner portion. Therefore, the user can use as the supplementary index for evaluating the time efficiency whether or not the moving direction of the pointer is corrected at the corner portion by visually observing the trajectory of the pointer at the corner portion of the displayed triangle.

Figure 5A:
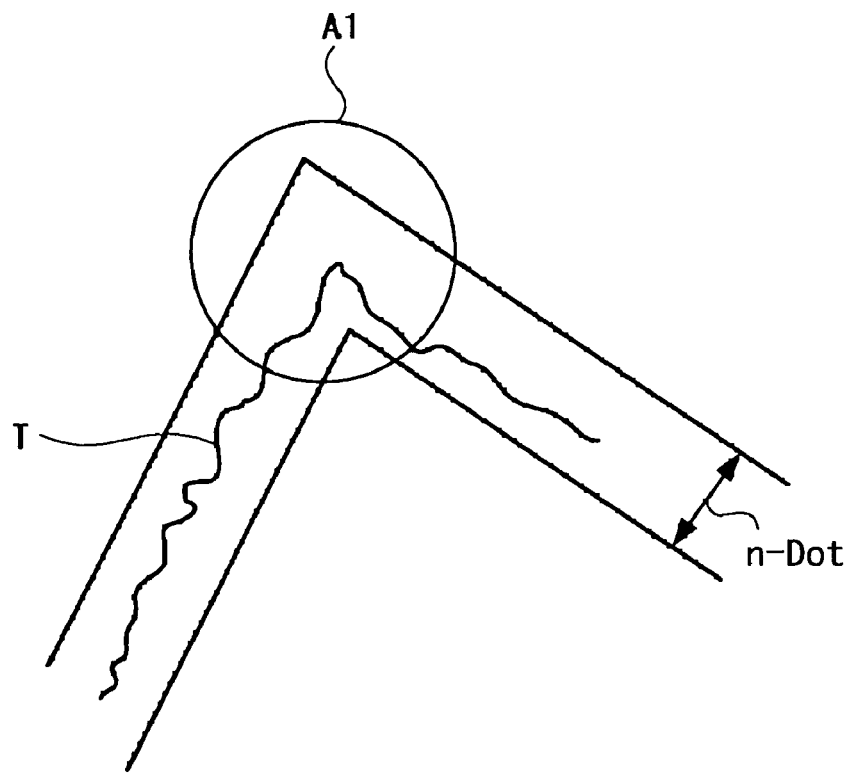
FIGS. 5A and 5B are diagrams respectively illustrating presence and absence of a correction of a direction of a pointer at a corner portion which is a supplementary index of a time efficiency evaluation.
Figure 5B:
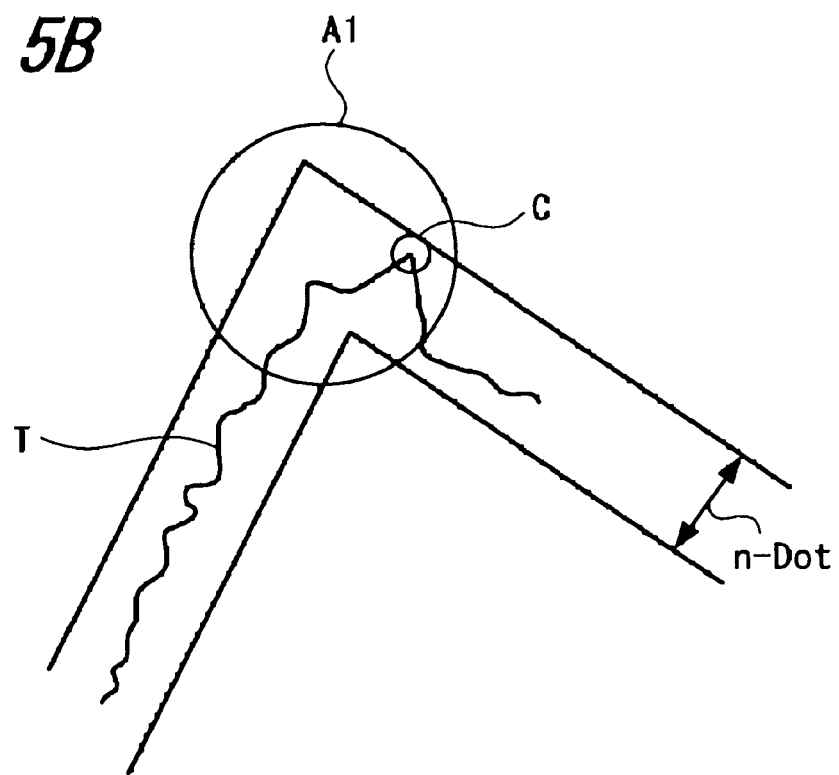

Specifically, as illustrated in FIGS. 5A and 5B, even in the cases where triangles of the same n-dot width have been drawn (5A, and 5B, respectively), it can be judged that the time efficiency is higher in the case where a moving direction T of a pointer is not corrected at a portion of a corner A1 (FIG. 5A) than in the case where the moving direction of the pointer is corrected at the portion of the corner A1 (FIG. 5B, and a point C is a point where the correction is made).

However, when comparing;

(a) the case where "the triangle of the n-dot width has been drawn" but "the moving direction of the pointer was corrected at the corner portion" and, (b) the case where "the triangle of the n-dot width has not been drawn" but "a triangle of an (n+1)-dot width has been drawn without correcting the moving direction of the pointer at the corner portion", the case of (a) is evaluated higher. Specifically, the narrowness of the dot width of the triangle drawn is prioritized higher as the evaluation index.

4. Size of Triangle

Although a size of a moving area of the pointer on the screen differs depending on an individual system, the smaller the area where the user should draw is, the lower in any system the requirement for the time efficiency becomes. Conversely, the necessity for evaluating the time efficiency of the pointing device in the system is higher in a case where the drawing area is large to some extent.

Figure 6:
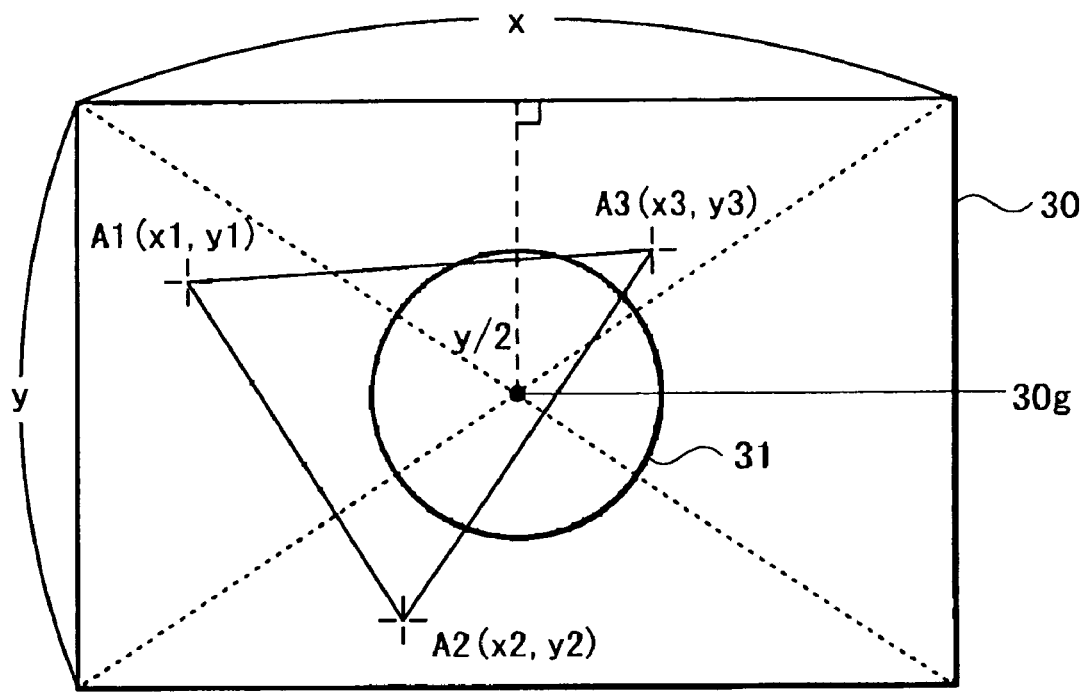
FIG. 6 is a diagram illustrating a size of a triangle to be displayed.

Then, as illustrated in FIG. 6, a reference circle 31 whose radius is one half the shortest distance y/2 (y is a longitudinal size of a screen) from a barycentric position 30g to an edge of a screen is set with the gravity position 30g of a screen 30 of a display device as the center. Further, all coordinates (x1, y1), (x2, y2), and (x3, y3) of respective vertices A1, A2, and A3 of a displayed triangle are made to be randomly sampled on the outside of this reference circle 31. However, one half is the default value, and a ratio of the radius of the reference circle 31 to the shortest distance y/2 is variable depending on a requirement of the system.

In addition to the above, the coordinates (x1, y1), (x2, y2), and (x3, y3) of the respective vertices A1, A2, and A3 are decided under the conditions that all of the x-coordinates and y-coordinates (positions in the horizontal direction and vertical direction of the screen) of respective vertices A1, A2, and A3 are different and a length of each side of the triangle is larger than the diameter y/2 of the reference circle 31.

Accordingly, since the length of each side of the displayed triangle becomes larger than one half the longitudinal size y of the screen and the user needs to draw the triangle of a large size to some extent, the evaluation can be done by reproducing a state where the requirement for the time efficiency is high in the system.

<Evaluation Program>

The evaluation program is prepared to evaluate the time efficiency under the policy described in <Basic Policy for Evaluation of Time Efficiency of Pointing Device> described above. Next, processing according to this evaluation program is specifically explained.

Figure 7:
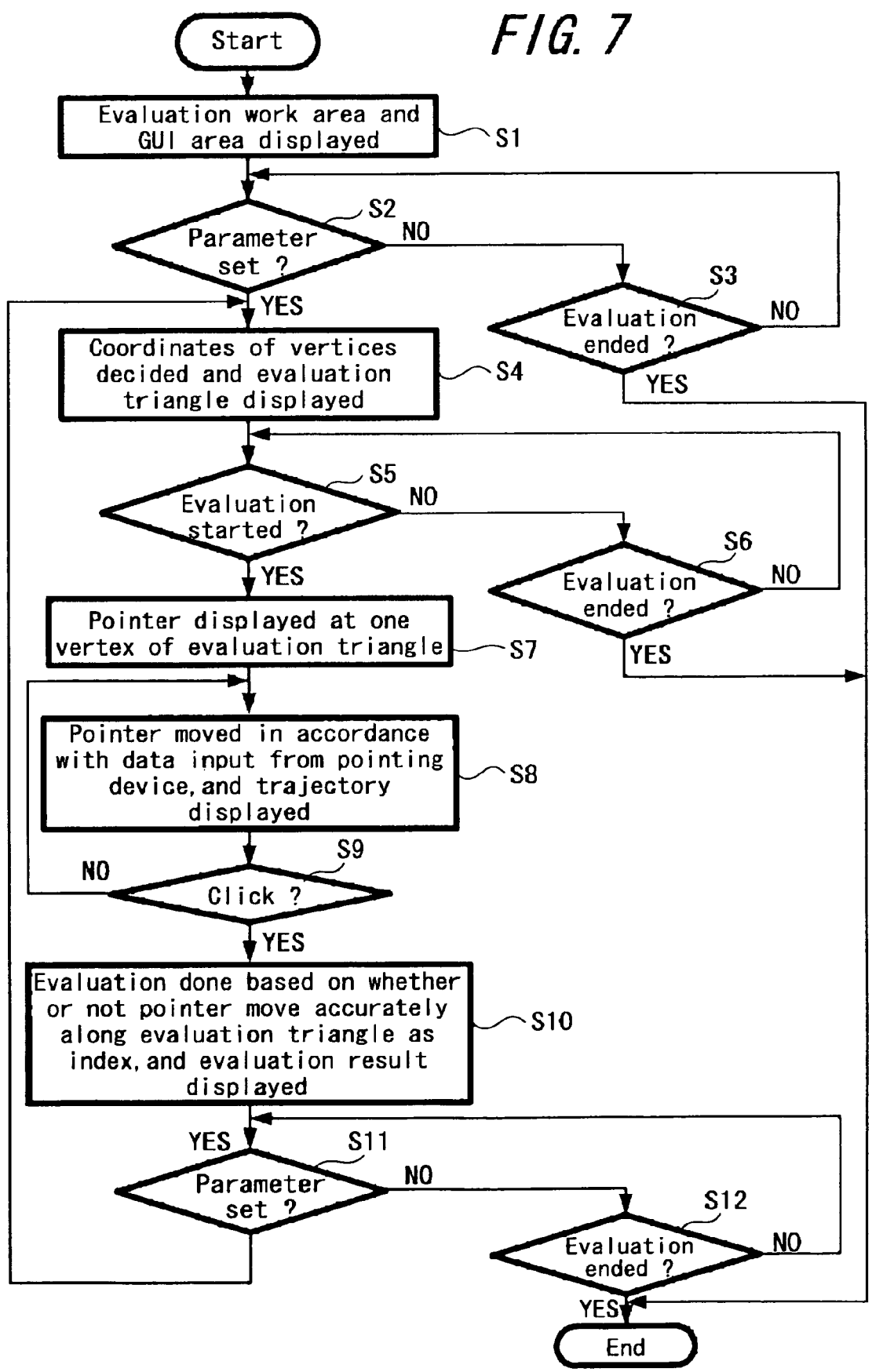
FIG. 7 is a flow chart showing contents of processing by a time efficiency evaluation program.

FIG. 7 is a flow chart showing contents of processing by the evaluation program. Further, FIGS. 8 through 12 are diagrams chronologically showing examples of screen display of a display device during an execution of the evaluation program.

As shown in FIG. 7, when the evaluation program is started, an evaluation work area where a triangle is displayed for a user to move a pointer and a GUI area where a parameter such as a dot width of a line segment is set by the user to give an instruction to display the triangle and to give an instruction to start and end the evaluation are displayed in the display device (the display device 4 in the system of FIGS. 1 and 2, and the display device 14 in the system of FIG. 3) (step S1).

Figure 8A:
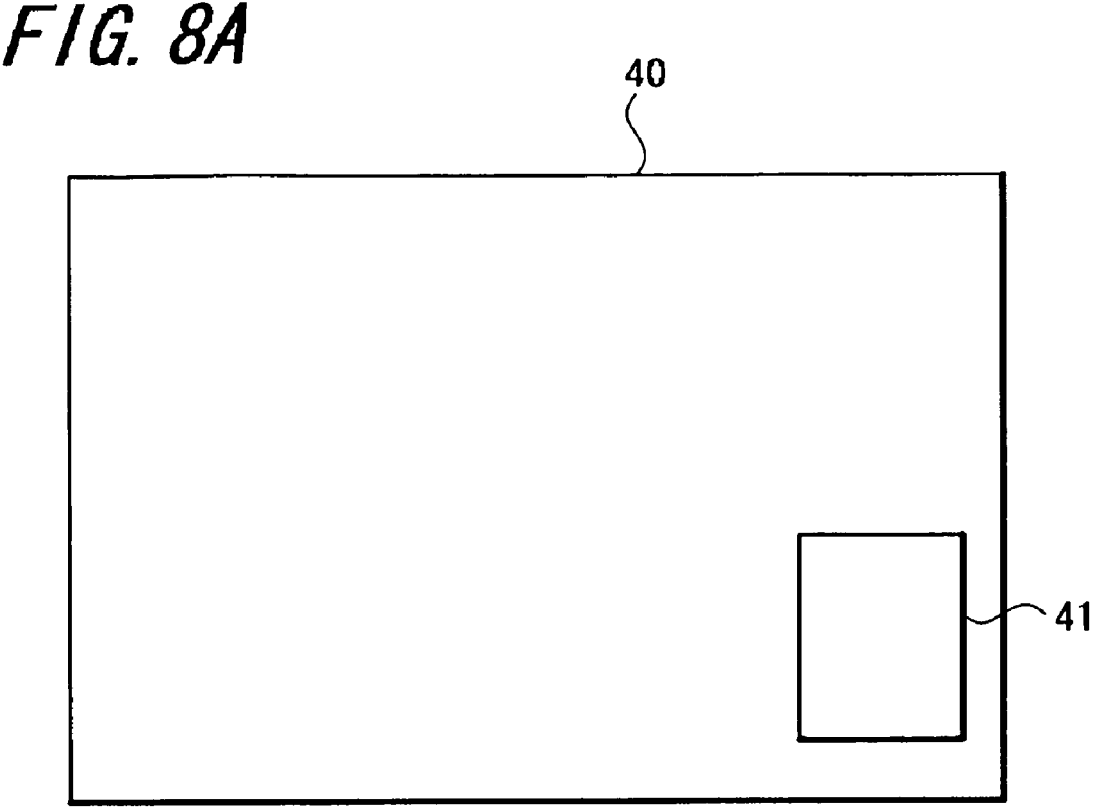
FIGS. 8A and 8B are diagrams showing an example of a screen display during an execution of the time efficiency evaluation program.
Figure 8B:
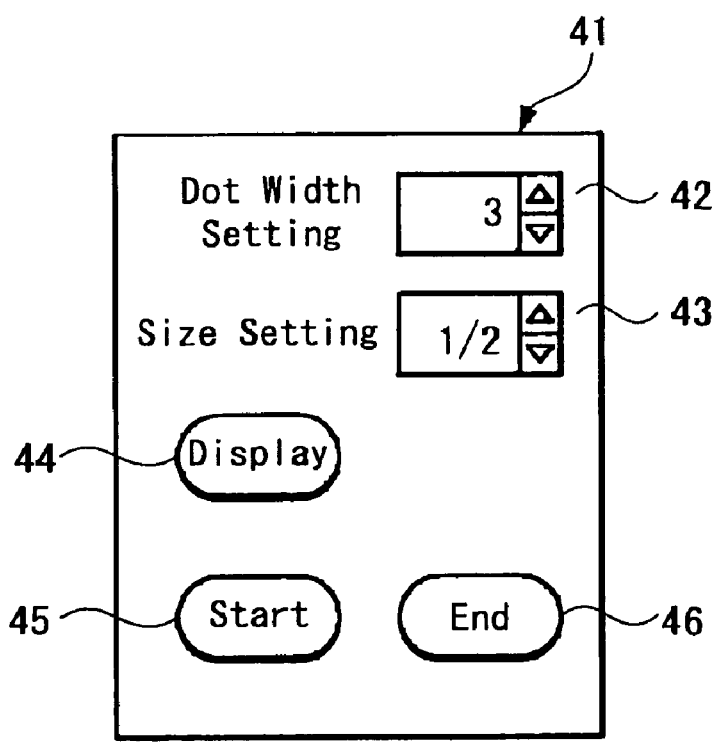

FIGS. 8A and 8B show an example of a screen display for those evaluation work area and GUI area. As shown in FIG. 8A, an evaluation work area 40 is displayed in the whole screen of the display device, and a GUI area 41 is displayed with a separate window in the corner of this evaluation work area 40. The GUI area 41 can be moved to an arbitrary position in the screen (therefore, to a position that does not overlap the triangle when the triangle is displayed in the evaluation work area) by dragging a pointing device.

As shown in FIG. 8B, in the GUI area 41 are provided a setting column 42 to set a dot width of the line segment, a setting column 43 to set a ratio of the radius of the reference circle 31 to the shortest distance y/2 of FIG. 6 in order to adjust the size of the triangle in accordance with the system, a display button 44 to give an instruction to display the triangle, a start button 45 to give an instruction to start the evaluation, and an end button 46 to give an instruction to end the evaluation.

In the setting column 42, only three dots or more can be set and three dots is set as default according to the policy described in 3. Evaluation Index of the above-described <Basic Policy for Evaluation of Time Efficiency of Pointing Device>. In the setting column 43, ½ is set as default according to the policy described in 4. Size of Triangle of the above-described <Basic Policy for Evaluation of Time Efficiency of Pointing Device>.

As shown in FIG. 7, subsequently to step S1, both of a judgment whether a parameter is set and an instruction is given to display the triangle in the GUI area (step S2) and a judgment whether an instruction to end the evaluation is given in the GUI area (step S3) are repeated until either one becomes YES.

When step S2 becomes YES, the coordinates of respective vertices of the triangle are randomly determined outside the reference circle as described in 4. Size of Triangle of <Basic Policy for Evaluation of Time Efficiency of Pointing Device>. Further, a triangle whose vertices are set at the determined coordinates (hereinafter, termed "evaluation triangle") is displayed in the evaluation work area by using the line segment of the set dot width (step S4).

Figure 9:
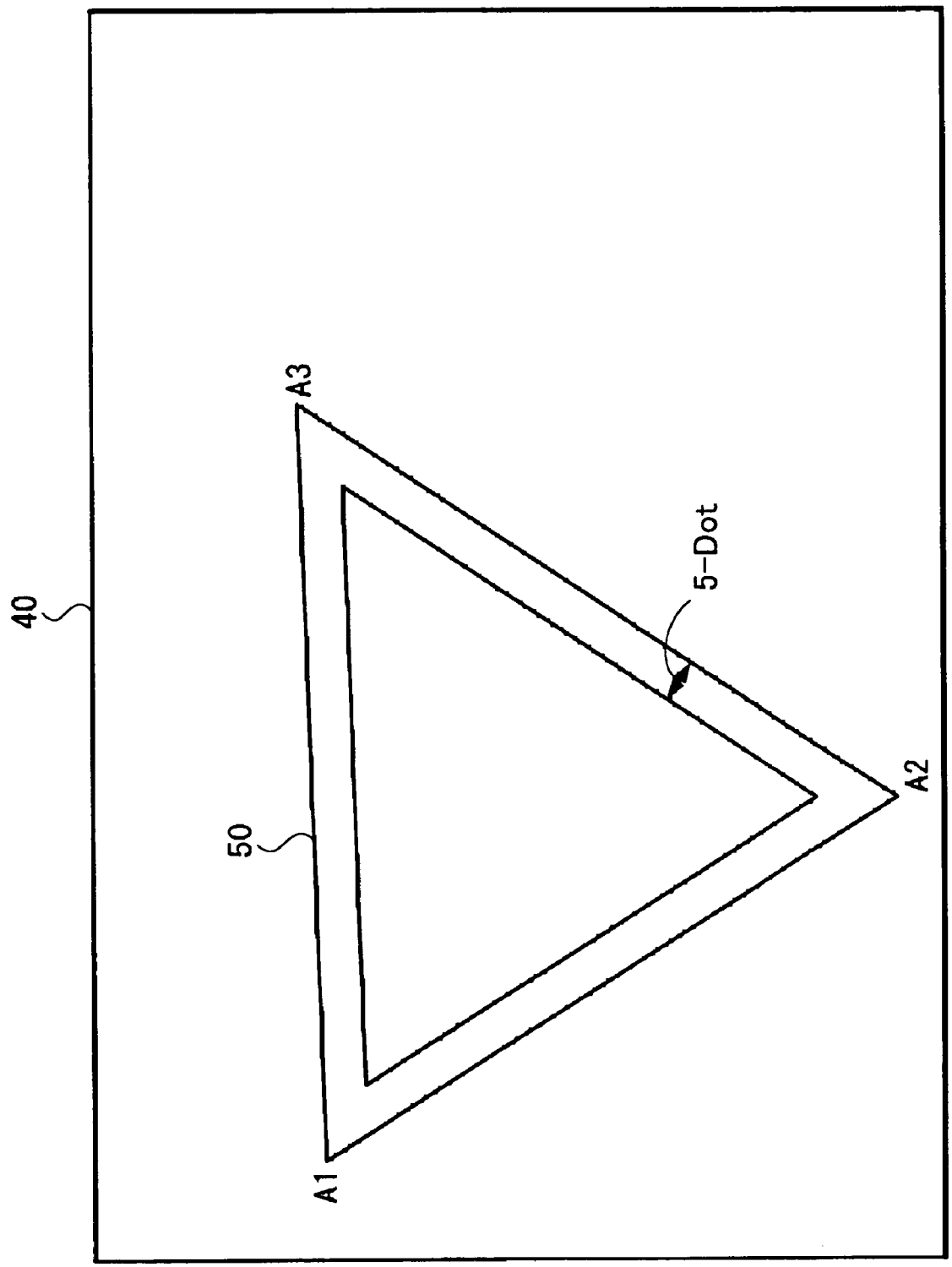
FIG. 9 is a diagram showing an example of a screen display during an execution of the time efficiency evaluation program.

FIG. 9 shows an example of a display of the evaluation triangle in the evaluation work area 40 of FIG. 8A. The ratio of the radius of the above-described reference circle is set to ½ (default), and a evaluation triangle 50 of a 5-dot width (this width is drawn wider than the actual for the convenience of illustration) is displayed. It should be noted that an illustration of the GUI area 41 is omitted in each of drawings of FIG. 9 and thereafter.

As shown in FIG. 7, subsequently to step S4, both of a judgment whether the instruction to start the evaluation in the GUI area (step S5) is given and a judgment whether the instruction to end the evaluation is given in the GUI area (step S6) are repeated until either one becomes YES.

When step S5 becomes YES, one vertex randomly selected from respective vertices of the evaluation triangle displayed in the evaluation work area is set as a start point for starting a movement of the pointer, and the pointer is displayed at the center position in the width direction in that vertex (step S7).

Figure 10:
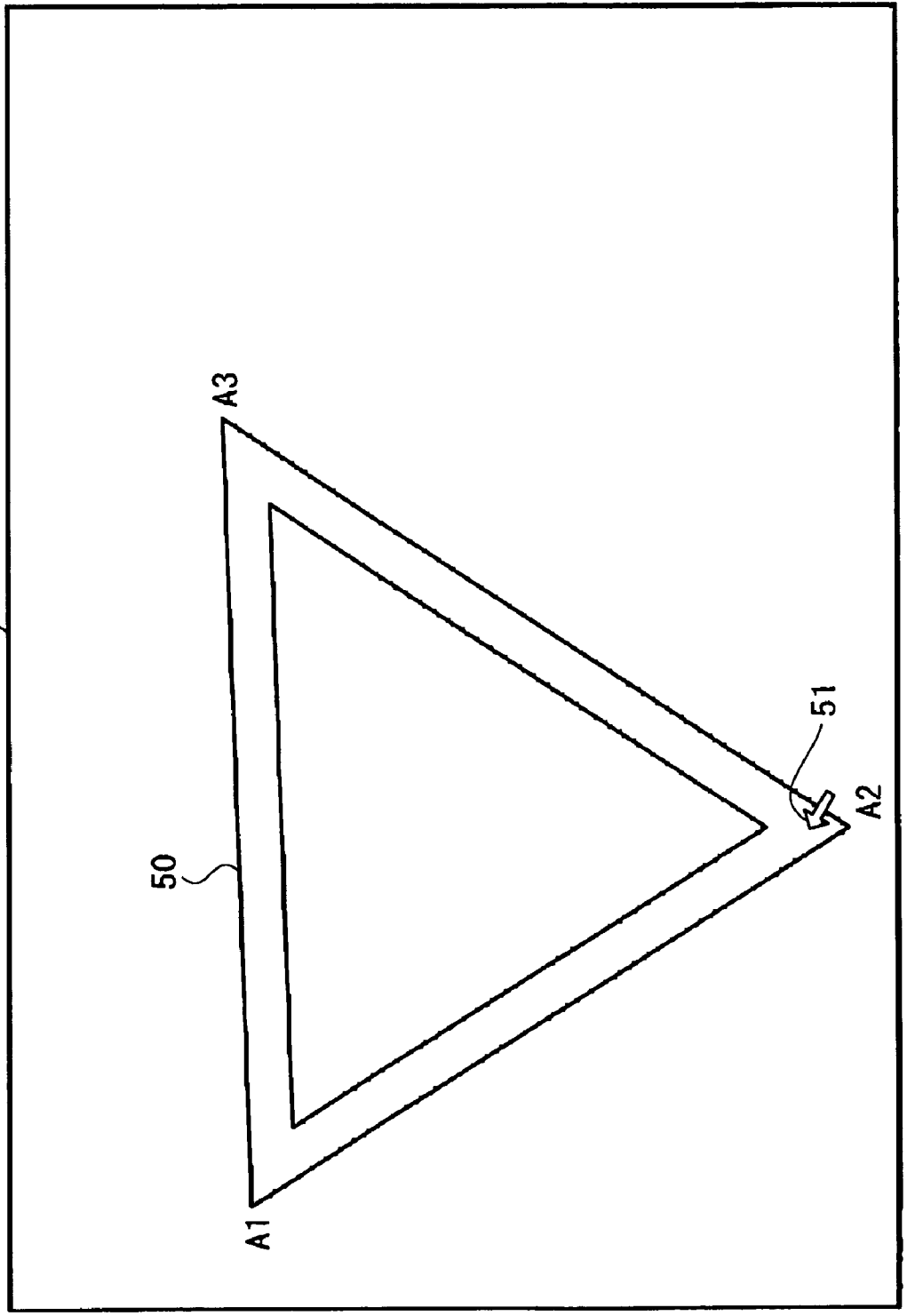
FIG. 10 is a diagram showing an example of a screen display during an execution of the time efficiency evaluation program.

FIG. 10 shows an example in which a pointer 51 is displayed in the vertex A2 among the respective vertices A1, A2, and A3 of the evaluation triangle 50 of FIG. 9.

As shown in FIG. 7, next to step S7, when there is data input from the pointing device (the pointing device 1 in the system of FIGS. 1 and 2, and the pointing device 11 in the system of FIG. 3), the pointer is moved from the start point in the evaluation work area in accordance with the input data and a trajectory of the movement of the pointer is displayed discriminatingly from the evaluation triangle (for example, in a different color from the line segment of the evaluation triangle) (step S8). Further, while making a judgment whether a click operation is performed with the pointing device (step S9), steps S8 and S9 are repeated until the click operation is performed.

Figure 11:
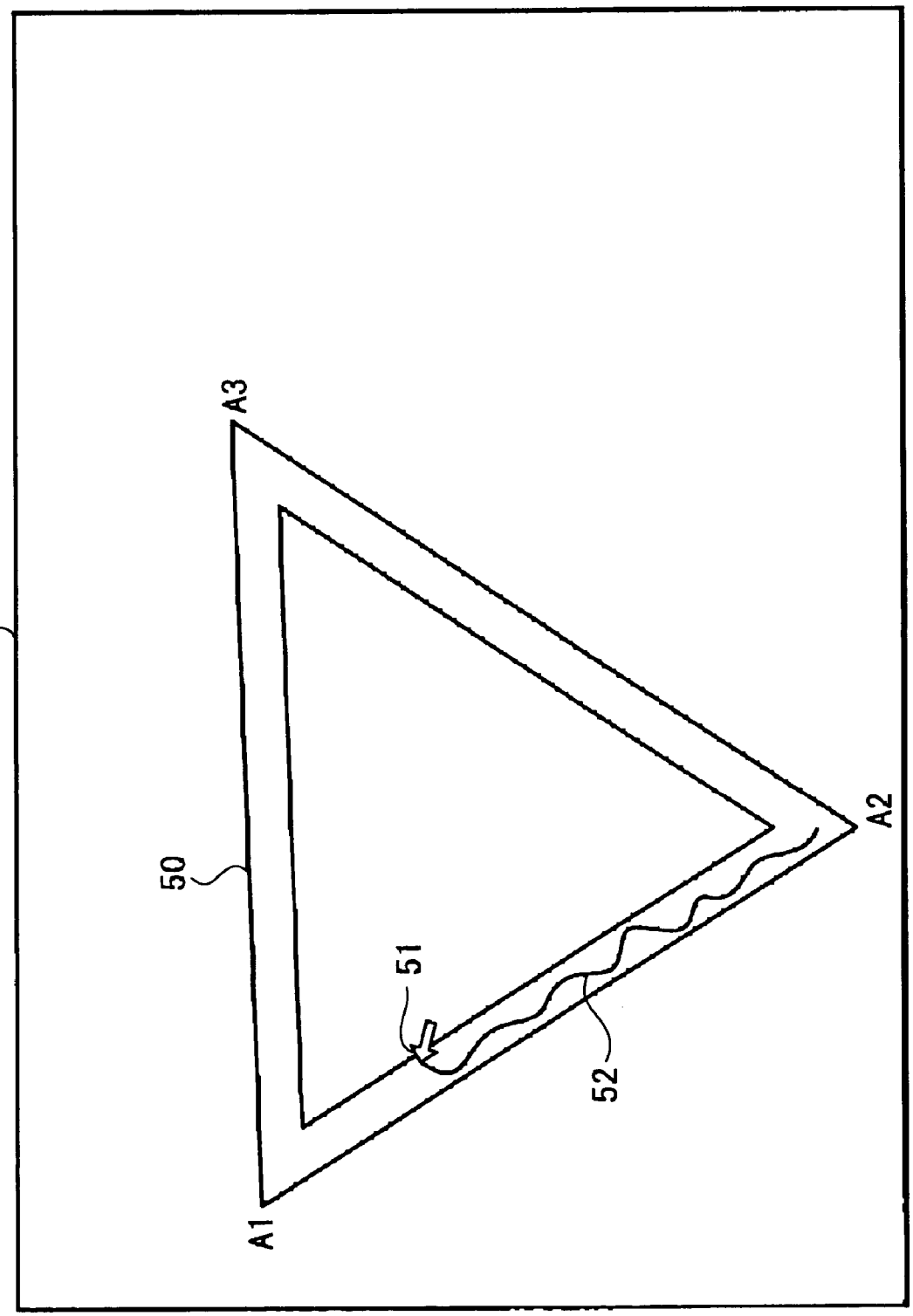
FIG. 11 is a diagram showing an example of a screen display during an execution of the time efficiency evaluation program.

FIG. 11 illustrates an example of an appearance of a display of a trajectory 52 of the pointer 51 from the vertex A2 of FIG. 10.

As shown in FIG. 7, when step 9 becomes YES, the time efficiency is evaluated based on whether or not the pointer has moved accurately along each side of the evaluation triangle (whether the pointer did not move off the side) as the index. At that time, the evaluation at the corner portion of the evaluation triangle (including the end point) is done based on whether the pointer passes straight through the corner portion as described in 2. Selection of Graphic to be Drawn of <Basic Policy for Evaluation of Time Efficiency of Pointing Device>. Further, an evaluation result thereof is displayed in a marginal portion of the evaluation work area (step 10).

Figure 12:
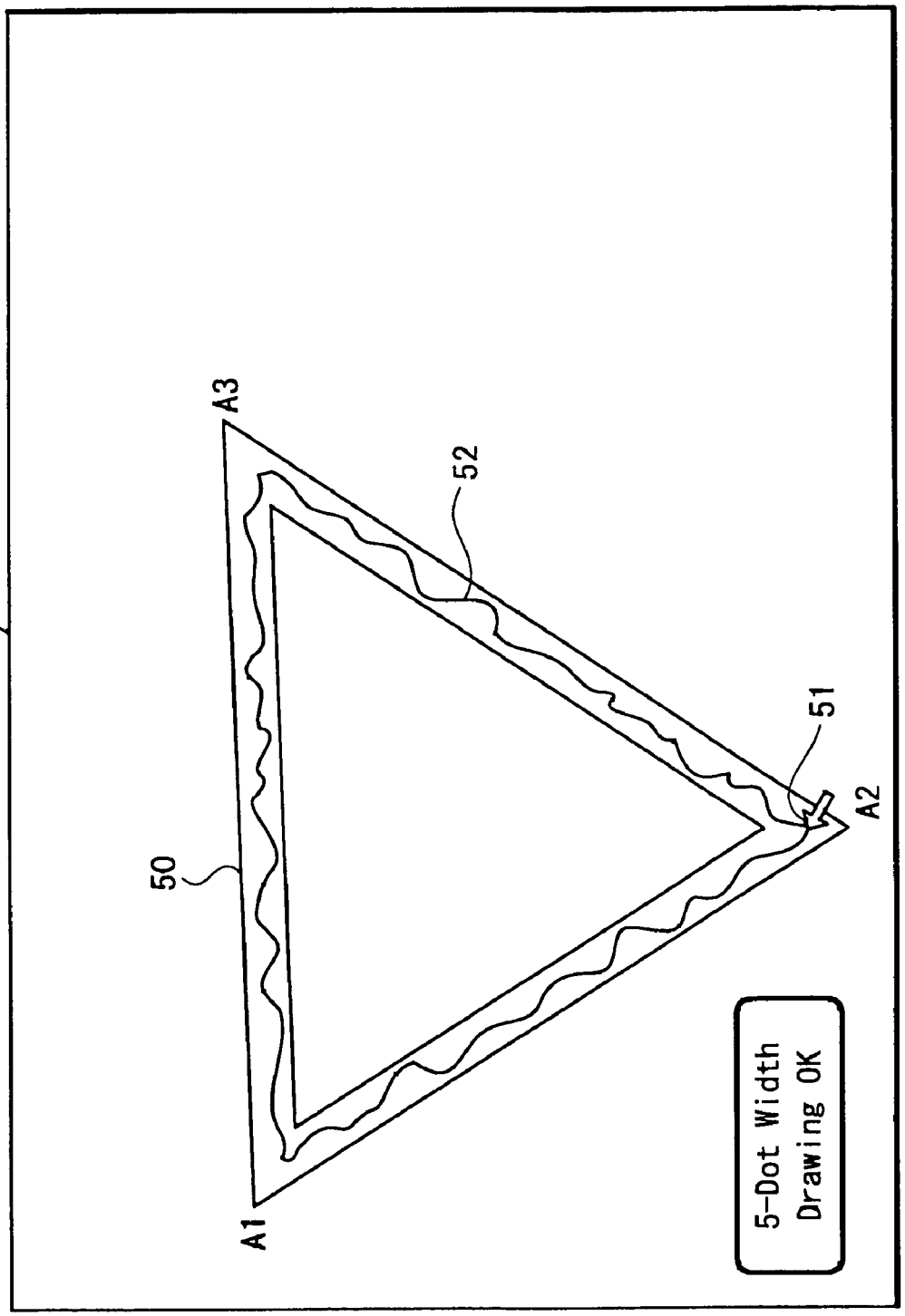
FIG. 12 is a diagram showing an example of a screen display during an execution of the time efficiency evaluation program.

FIG. 12 illustrates an example of an appearance of a display of the evaluation result after FIG. 11 in the case where the pointer 51 has accurately moved along each side of the evaluation triangle 50 and has returned to the vertex A2 (start point). Displayed are letters indicating that there has been obtained the evaluation result of "5-dot width drawing OK" which represents that the time efficiency is high. Here, on the contrary, letters indicating that there has been obtained the evaluation result of "5-dot width drawing NG" which represents that the time efficiency is not high are displayed when the pointer 51 did not move accurately along each side of the evaluation triangle after FIG. 11.

As shown in FIG. 7, subsequently to step S10, both of a judgment whether or not a parameter is newly set and an instruction to display a triangle is given in the GUI area (step S11) and a judgment whether an instruction to end the evaluation is given in the GUI area (step S12) are repeated until either one becomes YES (while this judgment is repeated, the state of screen display shown in step S10 is maintained as exemplarily shown in FIG. 12).

When step S11 becomes YES, after returning to step S4, the evaluation triangle is newly displayed again in the evaluation work area based on the new parameter, and step S5 and thereafter are repeated.

When step S3, S6, or S12 becomes YES, the display of the evaluation work area and GUI area is deleted, and the evaluation program is ended.

Note that the applicants of the present invention have already confirmed that the evaluation result of high time efficiency is obtained with respect to the evaluation triangle of the 3-dot width when this evaluation program is executed in a system under an environment described below.

CPU: Pentium® 4 2.4 GHz
    Memory: 512 MB
    Pointing device: a ball mouse directly connected to a computer using PS2 interface
    OS: Windows® XP
    Process activated: only evaluation program and system management program <Evaluation Work by User>

Finally, an explanation is made with respect to the evaluation work performed by the user during the execution of the evaluation program. When the evaluation program is started, the evaluation work area and GUI area are displayed in the display device as shown in FIG. 8. When the user sets a parameter such as a dot width in this GUI area and gives an instruction to display a graphic, an evaluation triangle is displayed in the evaluation work area as illustrated in FIG. 9. After that, when the user gives an instruction to start an evaluation in the GUI area, a pointer is displayed as illustrated in FIG. 10.

When the user operates the pointing device such that the pointer is moved along each side of the evaluation triangle, a trajectory of the pointer is displayed on the screen in accordance with the operation as illustrated in FIG. 11. The user can easily confirm whether the pointer moves accurately along this graphic by observing this trajectory (whether the pointer moves off this graphic).

Further, when the user clicks the pointing device after the pointer has moved along each side of the evaluation triangle and has returned again to the start point, the time efficiency is evaluated based on whether or not the pointer has moved accurately along the evaluation triangle as the index, and an evaluation result is displayed as illustrated in FIG. 12.

In this manner, the time efficiency of the pointing device is evaluated based on whether or not the user was able to move the pointer accurately along the evaluation triangle (in other words, whether the user was able to draw the same graphic as the evaluation triangle) as the index.

Accordingly, in the system that uses the pointing device as the input device (particularly, in the system that requires know-how in order to perform evaluation using the existing index such as the system in which the transmission path of the specific communication protocol exists between the pointing device and the devise that processes the input value thereof as shown in FIGS. 2 and 3, and the system in which a heavy load is constantly imposed on the CPU that processes the input value thereof), the time efficiency of the pointing device can be evaluated intuitively from the viewpoint of the user who uses the system.

In addition, as described in 3. Evaluation Index of the above-described <Basic Policy for Evaluation of Time Efficiency of Pointing Device>, by visually observing the trajectory of the pointer at the corner portion of the evaluation triangle, the user can use whether or not the moving direction of the pointer was corrected at the corner portion as the supplementary index for evaluating the time efficiency.

Further, since it is only necessary to draw a simple graphic made of line segments, which is a triangle, there rarely occurs a difference in evaluation result between a case where a user skilled in an operation of a pointing device operates and a case where a user other than skilled one operates. Therefore, the evaluation can be done almost without receiving an influence from such individual difference in skillfulness.

Furthermore, as described in <Basic Policy for Evaluation of Time Efficiency of Pointing Device>, since the graphic made of the line segments that are not parallel to the horizontal direction and vertical direction on the screen and made of the line segment of the 3-dot width or more is displayed, the evaluation can be done in the actual mode of using the pointing device in which 'the following work is performed by feeding back the movement result of the pointer on the screen'.

In addition, since it is possible to judge clearly at the corner portion whether or not the pointer has moved accurately along the displayed graphic by displaying the graphic of the triangle that has the corners as described in <Basic Policy for Evaluation of Time Efficiency of Pointing Device>, such effectiveness that the evaluation can be done more accurately can be obtained.

Further, as described in <Basic Policy for Evaluation of Time Efficiency of Pointing Device>, by displaying a polygon that is a triangle, it becomes not necessary to specifically display the end point of the pointer and the evaluation method at the other corners can also be used at the end point.

Moreover, as described in <Basic Policy for Evaluation of Time Efficiency of Pointing Device>, the evaluation can be done independently of the resolution of the pointing device with minimizing the user's operation by displaying a triangle having the least number of sides among polygons.

In addition, as described in <Basic Policy for Evaluation of Time Efficiency of Pointing Device>, since the triangle whose each side has the length of at least approximately one half the longitudinal size of the screen is displayed, the evaluation can be done by reproducing the state where the requirement for the time efficiency is high in the system.

Note that, a triangle is displayed as the graphic for evaluation in the above-described examples. However, as another example, other polygons than a triangle, which have a small number of sides such as a rectangular, and graphics having a corner but not a polygon (for example, a v-shaped graphic made of line segments of two sides forming one corner) may be displayed as the graphic for evaluation as described in 2. Selection of Graphic to be Drawn of <Basic Policy for Evaluation of Time Efficiency of Pointing Device>.

[Evaluation of Real-Time Nature of Pointing Device]

Next, an explanation is made to an apparatus, method, program, and recording medium for evaluating the real-time nature of a pointing device according to another embodiment of the present invention.

Here, to the above-described systems of FIGS. 1 through 3, the apparatus, method, program, and recording medium for evaluating the real-time nature of the pointing device according to the embodiment of the present invention is applied.

However, it is assumed here that a joystick operated in eight directions (up, down, left, right, upper left, lower left, upper right, and lower right) is used as the pointing device 1 in FIGS. 1 and 2, and the pointing device 11 in FIG. 3. (the pointing device 1 in FIGS. 1 and 2 is termed a joystick 1, and the pointing device 11 in FIG. 3 is termed a joystick 11.)

Further, an "evaluation program" for evaluating the real-time nature of contents of processing as described later on is stored in the external storage device 3 of FIGS. 1 and 2 and the built-in HDD of the computer 13 of FIG. 3 instead of the "evaluation program" for evaluating the time efficiency as described above. This evaluation program may be installed from a recording medium such as a CD-ROM, or may be downloaded and installed from a Web site.

It should be noted that the systems shown in FIGS. 1 through 3 are only examples and the apparatus, method, program, and recording medium for evaluating the real-time nature of the pointing device according to the embodiment of the present invention can be applied to all systems to which data input from a joystick is supplied.

<<Basic Policy of Evaluation Program>>

An explanation is made with respect to a basic policy of the evaluation in the evaluation program for evaluating the real rime nature.

<Evaluation of Real-Time Nature>

In a system in which data input from a joystick (joystick 1 in FIG. 2, and joystick 11 in FIG. 11) is supplied through a transmission path of a specific protocol (TCP/IP in FIG. 2, and UART in FIG. 3) such as the systems of FIGS. 2 and 3, the real-time nature of whether or not an operation of the joystick is reflected on real time in a screen display is greatly influenced by the communication performance of the transmission path rather than the performance of the joystick itself. Therefore, it is preferable that this real-time nature can be evaluated as the whole system including the transmission path.

<Evaluation Method of Real-Time Nature>

In the systems shown in FIGS. 1 through 3, it is conceivable that there are such requirements as the followings 1) through 5) with respect to a method of evaluating the real-time nature of the screen display by the operation of the joystick.

1) evaluating whether a user can make a pointer reach efficiently an intended point 2) evaluating whether there is sufficient real-time nature for all moving directions of a pointer when a user uses a system 3) evaluating efficiently 4) evaluating intuitively 5) easily judging an evaluation index Here, the requirement of the above-described item 1) is satisfied when a target point is displayed on the screen of the display device (the display device 4 in the systems of FIGS. 1 and 2, and the display device 14 in the system of FIG. 3) to evaluate whether the pointer has reached efficiently this target point.

Further, it is only necessary to dispose this target point correspondingly to eight directions of up, down, left, right, upper left, lower left, upper right, and lower right which are the directions of the pointer moved by the joystick in order to satisfy the requirement of the above-described item 2) at the same time. To dispose the target points correspondingly to the moving direction of the pointer is equivalent to disposing the target points at positions that can be reached when making the pointer move straight in the moving direction thereof.

In addition, it becomes close to an actual state of the system used by the user when combining and disposing a plurality of target points corresponding to the mutually different moving directions in evaluation at one time. Therefore, the method for evaluating the real-time nature can be replaced with a method of combining a plurality of moving directions of the pointer (a plurality of operating directions of the operation bar of the joystick).

<Method of Combining Operation Directions>

In case of the joystick having eight operation directions (up, down, left, right, upper left, lower left, upper right, and lower right), since the number of disposition patterns of the target points becomes enormous when the disposition patterns of the target points are determined by combining the operation directions at random and the disposition patterns of the target points are determined by combining all the eight directions, there is a contradiction to the above-described requirement of 3) of <Evaluation Method of Real-time Nature> (requirement for evaluating efficiently).

Then, the disposition patterns of the target points are narrowed down into the minimum number of patterns that represent both of the directions of the pointer moved by the joystick and the actual state of using the system (actual usage status of joystick) by the user in consideration of points in the following 1) through 4).

1) The eight directions of up, down, left, right, upper left, lower left, upper right, and lower right that are the directions of the pointer moved by the joystick can roughly be divided into the horizontal direction (left and right direction) and vertical direction (up and down direction) that become a baseline of the operation direction, and two intermediate directions (direction connecting the upper left and lower right, and direction connecting the upper right and lower left).

2) For the user, the horizontal direction and the vertical direction are easier to operate.

3) In the actual state of using the joystick, it is rare that the pointer reaches a user's intended position only by moving the pointer in one direction, but typically it is necessary to move the pointer continuously in two or more directions among the horizontal direction, vertical direction, and intermediate directions.

4) From the above-described 3), the moving directions of the pointer can be represented by four directions that are a direction from an upper left position toward a lower right position on the screen, a direction from an upper right position toward a lower left position on the screen, a direction from a lower left position toward an upper right position on the screen, and a direction from a lower right position toward an upper left position on the screen as a whole from the start point of the movement to the user's intended point in the actual state of use.

From the above-described 1) and 2), it is only necessary to combine four target points in total that are one target point disposed in the horizontal direction (left and right direction), one target point disposed in the vertical direction (up and down direction), one target point disposed in one intermediate direction (direction connecting the upper left and lower right), and one target point disposed in the other intermediate direction (direction connecting the upper right and lower left). In other words, those four target points can represent the eight directions of the pointer moved by the joystick. Further, the order of disposing those four target points can be either disposing continuously both of the target point on the horizontal direction and the target point on the vertical direction and disposing continuously the target points in two intermediate directions, or alternately disposing the target points in the horizontal and vertical directions interchanged with the target points in the intermediate directions.

Figure 13:
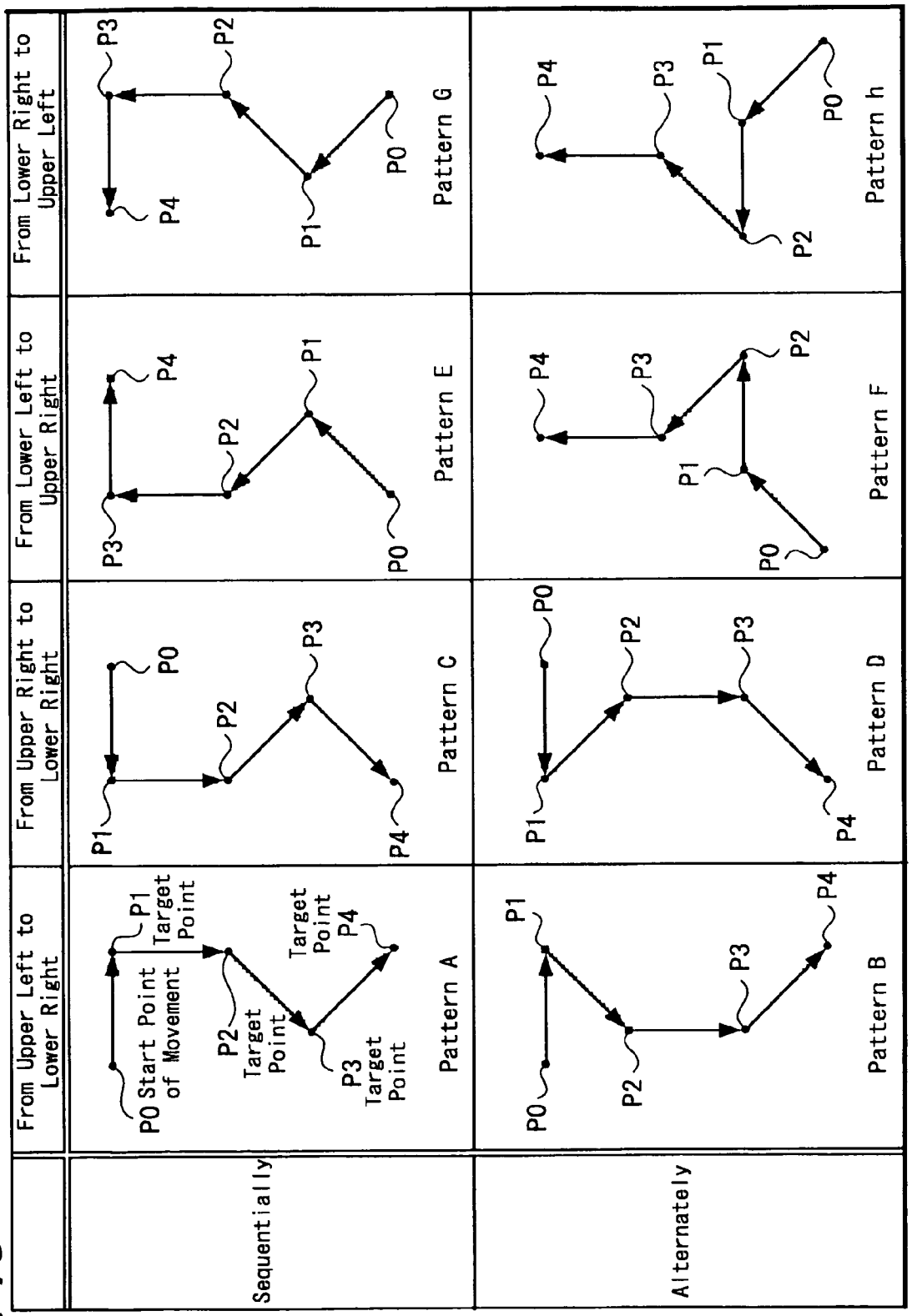
FIG. 13 is a diagram showing a disposition pattern of a target point used for evaluating the real-time nature.

When those described in the above and the above-described 4) are put together, the direction of the pointer moved by the joystick and the actual state of using the joystick can be represented by total eight patterns as shown in FIG. 13, including a pattern in which those four target points P1 through P4 are disposed such that the moving direction of the pointer as a whole from the start point of movement P0 to the final target point P4 is directed from an upper left position to the lower right position on the screen (patterns A, and B), a pattern in which the above four target points are disposed such that the moving direction of the pointer as a whole from the start point of movement P0 to the final target point P4 is directed from an upper right position to the lower left position on the screen (patterns C, and D), a pattern in which the above four target points are disposed such that the moving direction of the pointer as a whole from the start point of movement P0 to the final target point P4 is directed from a lower left position to an upper right position on the screen (patterns E, and F), and a pattern in which the above four target points are disposed such that the moving direction of the pointer as a whole from the start point of movement P0 to the final target point P4 is directed from a lower right position to an upper left position on the screen (patterns G, and H).

Thus, the evaluation of the real-time nature can be done efficiently by narrowing down the disposition patterns of the target points into the minimum number of patterns representing the direction of the pointer moved by the joystick and the actual state of using the joystick.

Here, the patterns A, C, E, and G in the upper columns among the eight disposition patterns of FIG. 13 are the patterns to dispose continuously the target points in the horizontal direction and in the vertical direction and to dispose continuously the target points in two intermediate directions. In addition, the patterns B, D, F, and H in the lower columns are the patterns to alternately dispose the target points in the horizontal direction and in the vertical direction interchanged with the target points in the intermediate directions. In such alternate disposition pattern, it is desirable to dispose the target points such that the pointer is moved from the up and down direction to the intermediate direction (patterns B, and D), from the left and right direction to the intermediate direction (patterns B, and D), from the intermediate direction to the left and right direction (patterns F, and H), and from the intermediate direction to the up and down direction (patterns F, and H) as shown in the drawing.

Hereinafter, the eight disposition patterns of FIG. 8 are called "evaluation patterns" used for evaluating the real-time nature. In case of a system that uses a joystick which has operation directions of more than eight directions, it is also conceivable that the evaluation pattern is further increased correspondingly to the number of operation directions thereof, but basically the evaluation of the real-time nature can be done efficiently with those eight disposition patterns are set as the evaluation patterns.

<Other Points to be Considered>

A distance to each target point on the screen is set to the same with respect to all of the above-described four target points. This is to evaluate equally the real-time nature for all the directions of the pointer moved by the joystick. The distance is specifically determined in accordance with a standard amount of a range where the pointer is moved on the screen in a system to be used. In addition, depending on a device driver of a joystick, there is one that can be operated such that an input value is added to accelerate a pointer if the operation direction is the same. In case of such device driver, there is also conceivable a method of making the distance to be set such that the user can actually feel the acceleration.

A size of the target point on the screen is set to the minimum size of the object to be pointed on the screen in that system. For example, this size becomes the minimum size (16 dots×16 dots) of a button in a typical window in case of a computer in which Windows® operates as OS.

The eight evaluation patterns of FIG. 13 are displayed at random since there is a possibility that the user becomes acquainted with the operation when displayed repeatedly in the same order.

The operation of the joystick is based on the premise that the operation bar is tilted to the maximum in order to eliminate an individual difference.

<Evaluation Index>

Whether time elapsed from the start of the operation of the joystick to reaching the final target point goes clear a set value is set as an evaluation index of the real-time nature. An allowable range of time for reaching one target point is determined considering the convenience of the system, and time required for reaching the final target point is measured by making a value obtained from multiplying the time and the number of target points (four times) as the set value.

Although it is also conceivable that a distance of the trajectory of the pointer is measured as the evaluation index, time should be the evaluation index in order to evaluate whether the operation of the joystick is reflected on real time in the screen display. In addition, in the case where the distance is set as the evaluation index, the evaluation is made as a comparison with the shortest distance (the distance to the target point multiplied by the number of target points); and since know-how is required in order to judge whether the comparison result is sufficient when using the system, there is a contradiction to the requirements in the above-described 4) and 5) of <Evaluation Method of Real-time Nature> (requirements for evaluating intuitively and for a judgment of an evaluation index easily made).

<<Evaluation Program>>

The evaluation program is formed to evaluate the real-time nature based on the policy described in the above-described <<Basic Policy of Evaluation Program>>. Next, processing by this evaluation program is specifically explained.

FIG. 14 is a flow chart showing contents of processing by the evaluation program. Further, FIGS. 15 and 16 are diagrams chronologically showing examples of screen display of the display device (the display device 4 in the system of FIGS. 1 and 2, and the display device 14 in the system of FIG. 3) during an execution of the evaluation program.

As shown in FIG. 14, when the evaluation program is started, a column for a user to input time of an evaluation index, a distance to a target point, and a size of the target point as parameters is displayed on the screen, and those parameters are set according to the input result. In the case where the user dose not input the parameters, the parameters automatically are set according to the policy described in the above-described <Other Points to be Considered> and <Evaluation Index> (step S21).

Subsequently, the order of displaying the eight evaluation patterns shown in FIG. 13 is randomly decided (step S22). Further, a first evaluation pattern is displayed on the screen, and the pointer is moved to a point where movement starts (step S23).

Figure 15A:
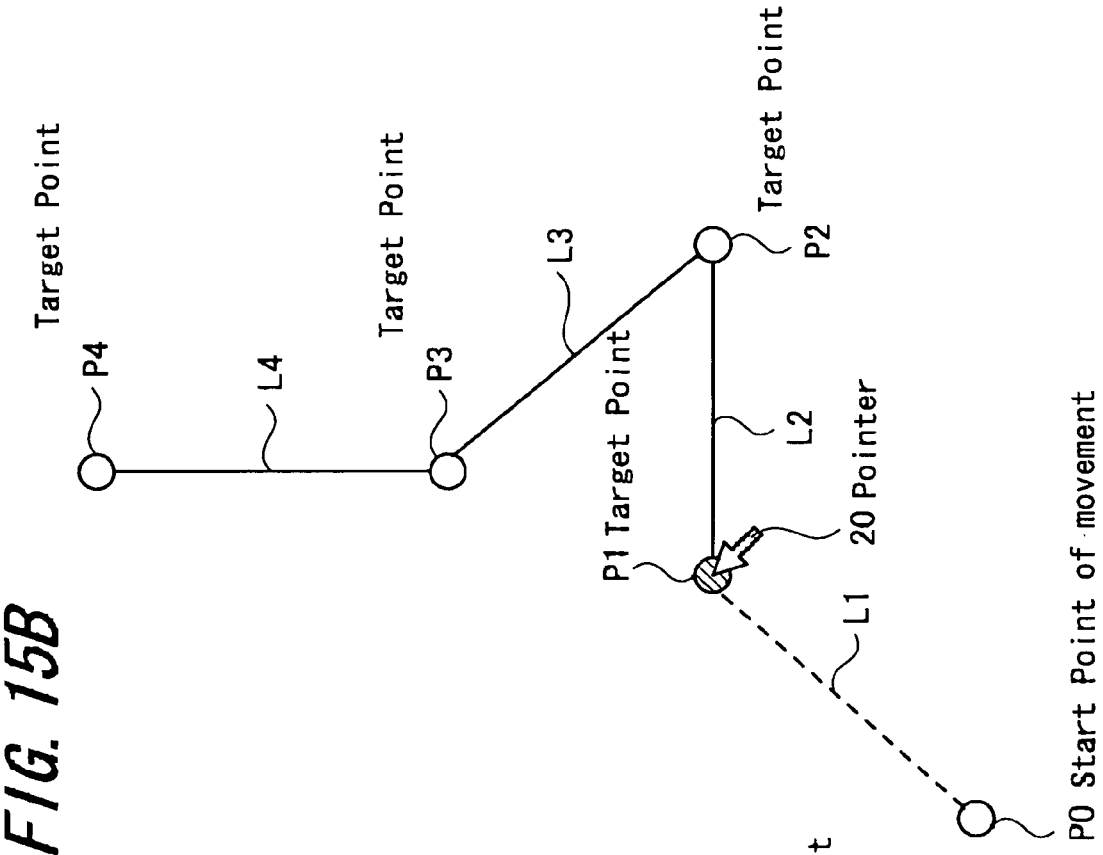
FIGS. 15A and 15B are diagrams chronologically showing an example of a screen display during an execution of the real-time nature evaluation program.
Figure 16:
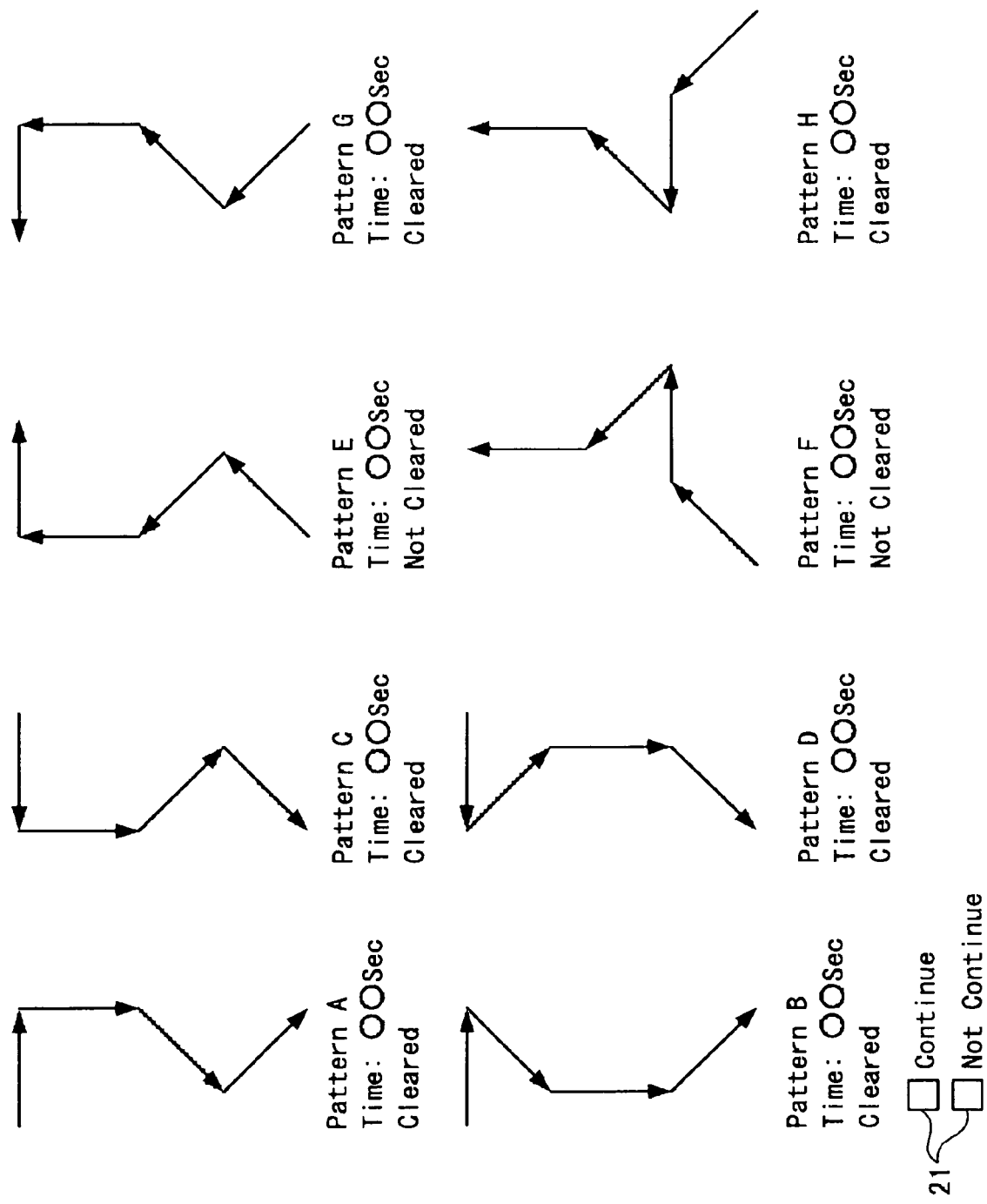
FIG. 16 is a diagram chronologically showing an example of a screen display during an execution of the real-time nature evaluation program.

FIG. 15A shows an example in which the pattern F of FIG. 13 is displayed as the first evaluation pattern. A pointer 20 is moved to the movement start point P0. Lines L1, L2, L3, and L4 to lead the pointer to the target points P1, P2, P3, and P4 sequentially from the movement start point P0 to the final target point P4 are also displayed. A distance to each of the target points P1 through P4 (specifically, lengths of the lines L1 through L4) is set equal with respect to all of the target points P1 through P4 in accordance with the policy described in the above-described <Other Point to be Considered>.

When thereafter there is data input from the joystick, the pointer is moved from the movement start point P0 on the screen in accordance with the input data, and a measurement of time elapsed from the start of movement is started as shown in FIG. 14. In addition, whenever the pointer reaches any one of the target points, the target point (and a line to the target point) is displayed discriminatingly from an target point to be reached (and a line to the target point to be reached) (step S24).

Figure 15B:
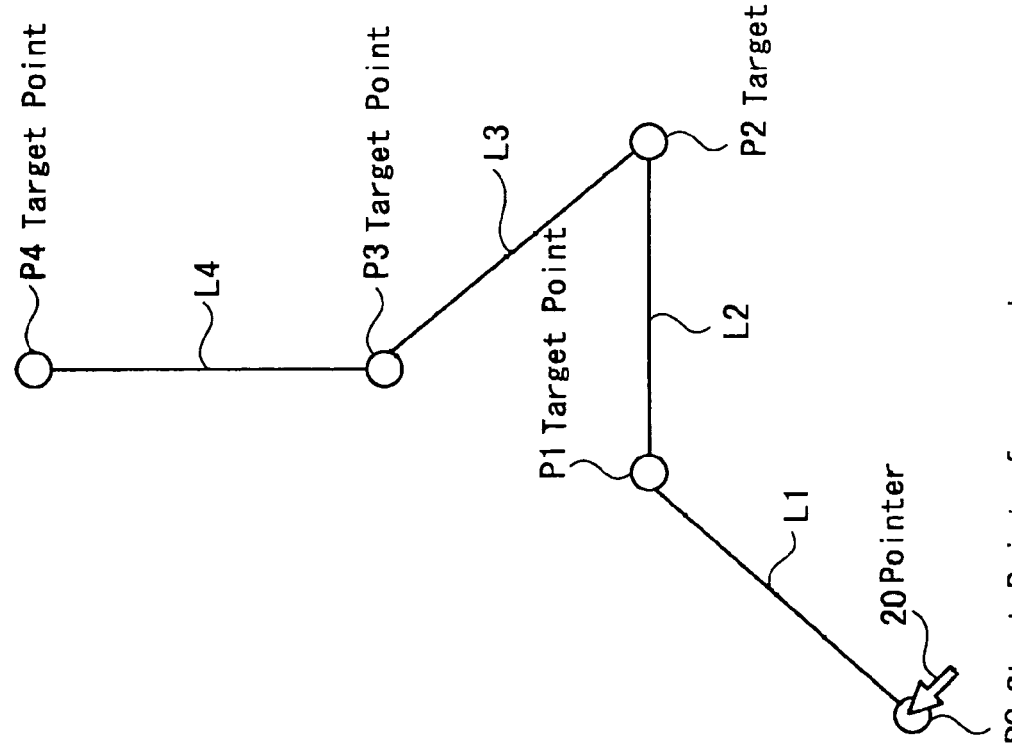

FIG. 15B shows a state where the pointer has reached the target point P1 of FIG. 15A. In this state, the target point P1 and the line L1 are displayed discriminatingly from the target points P2 through P4 and the lines L2 through L4. (although an appearance of the discriminative display is drawn by using a broken line and hatching in the drawing, the discriminative display may actually be made using a different color and the like).

When the pointer reaches thereafter the final target point P4, time required until the pointer reaches the target point is stored in association with the displayed evaluation pattern (the pattern F in the example of FIGS. 15A and 15B) as shown in FIG. 14 (step S25).

Subsequently, it is judged whether the display of the eight evaluation patterns is completed (step S26). If it is judged NO, the evaluation pattern of the next order decided in step S22 is displayed on the screen, and the pointer is moved to the start point of movement (step S27). Then, steps S24 and S25 are repeated with respect to the evaluation pattern.

When the judgment becomes YES in step S26, the real-time nature is evaluated by comparing the time required for each evaluation pattern stored in step S25 with the set value (the value set in step S21), and a screen to inform a result thereof is displayed (step S28). FIG. 16 shows an example of the evaluation result screen. The time required for each evaluation pattern stored in step S25 and information of whether the required time gone clear the set value are displayed together with the graphic of the evaluation pattern, and a column 21 for the user to specify whether the evaluation work is continued is also displayed.

Further, it is judged whether the user has determined the continuation (step S29), then the process returns to step S21 if it is judged YES, and the evaluation program is ended if it is judged NO.

<<Evaluation Work by User>>

The evaluation work performed by the user during the execution of the evaluation program is explained. When the evaluation program is started, as illustrated in FIG. 15A, the target points P1 through P4 (one of the eight evaluation patterns) which are disposed correspondingly to the direction of the pointer 20 moved by the joystick are displayed.

The work required for the user is only to operate the joystick in order to make the pointer 20 reach the target points P1 through P4 sequentially on the screen. When the pointer 20 reaches the individual target point during the process, that target point is displayed discriminatingly from a target point to be reached as illustrated in FIG. 15B. Accordingly, it is possible to confirm visually and easily that the pointer has reached each of the target points P1 through P4.

After this work is completed with respect to all of the eight evaluation patterns, the real-time nature is evaluated based on the time required for reaching the final target point P4 as the index, and the evaluation result screen as illustrated in FIG. 16 is displayed.

When the required time goes clear the set value in all the evaluation patterns, it can be judged that the real-time nature is sufficient. In addition, in the case where, for example, there appears such a tendency that a majority of users are unable to clear the set value with respect to a specific evaluation pattern as the result of performing the evaluation work by a plurality of users, the result can be used as a material for the purpose of improving the operation characteristic of the joystick, or for the purpose of rather improving the application software (a software for presentation, a software of game and the like).

Thus, the real-time nature of the screen display in the case where the data input from the joystick is supplied through the transmission path of a predetermined protocol is evaluated based on the time required for reaching the target point disposed correspondingly to the moving direction of the pointer as only one index.

Accordingly, in such a system in which the data input from the joystick is supplied as the systems of FIGS. 1 through 3, the real-time nature of the screen display can be evaluated intuitively and easily from the viewpoint of whether to be sufficient when the user uses that system.

Further, particularly in such a system in which the data input from the joystick is supplied through the transmission path of a predetermined protocol as the systems of FIGS. 2 and 3, the real-time nature of the screen display can be evaluated as a whole system including the transmission path.

Moreover, the evaluation work can be performed efficiently since the evaluation patterns are narrowed down to the minimum number of patterns that represent both of the direction of the pointer moved by the joystick and the actual state of using the joystick as described in the above-described <Method of Combining Operation Directions>.

It should be noted that, in the above described examples, the apparatus, method, program, and recording medium for evaluating the real-time nature of the pointing device according to the embodiment of the present invention are applied to the systems using the joystick. However, as a kind of pointing device, there also exists the one having a plurality of push-buttons corresponding one-on-one to a plurality of directions (for example, four directions of up, down, left, and right, or eight directions of up, down, left, right, diagonal upper left, diagonal lower left, diagonal upper right, and diagonal lower right) and a moving direction of a pointer on the screen is specified by depressing those push-buttons. The apparatus, method, program, and recording medium for evaluating the real-time nature of the pointing device according to the embodiment of the present invention may be applied to a system that uses all kinds of pointing devices having operation unit to move a pointer in a plurality of directions including the pointing device of such push-button type other than the joystick.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for evaluating time efficiency of a pointing device, comprising:
    image display means;
    processing means to display a graphic made of at least two sides not parallel to each other on a screen of said image display means, each side being a line segment having a width greater than a predetermined width; and
    evaluation means to display a trajectory of a pointer on said screen based on a movement of the pointer on said screen in accordance with data input from a pointing device and to evaluate using whether the pointer has moved along each side of said graphic as an index,
    wherein the predetermined width is greater than the display width of the trajectory of the pointer.

2. An apparatus for evaluating time efficiency of a pointing device according to claim 1, wherein said processing means displays a graphic made of sides not parallel to the horizontal direction and vertical direction on the screen.

3. An apparatus for evaluating time efficiency of a pointing device according to claim 1, wherein said processing means displays a graphic having at least one corner.

4. An apparatus for evaluating time efficiency of a pointing device according to claim 1, wherein said processing means displays a polygon.

5. An apparatus for evaluating time efficiency of a pointing device according to claim 1, wherein said processing means displays a triangle.

6. An apparatus for evaluating time efficiency of a pointing device according to claim 1, wherein said processing means displays a triangle each side of which has a length of substantially one half or greater than the longitudinal size of a screen.

7. A method for evaluating time efficiency of a pointing device, comprising:
    a first step of displaying a graphic made of at least two sides not parallel to each other on a screen of an image display means, each side being a line segment having a width greater than a predetermined width; and
    a second step of displaying a trajectory of a pointer on said screen based on a movement of the pointer on said screen in accordance with data input from a pointing device and of performing evaluation using whether the pointer has moved along each side of said graphic as an index,
    wherein the predetermined width is greater than the display width of the trajectory of the pointer.

8. A computer readable recording medium in which a program is recorded to make a computer execute the procedures of:
    displaying on a screen of an image display means a graphic made of at least two sides not parallel to each other, each side being a line segment having a width greater than a predetermined width; and displaying a trajectory of a pointer on said screen based on a movement of the pointer on said screen in accordance with data input from a pointing device and performing evaluation using whether this pointer has moved along each side of said graphic as an index, wherein the predetermined width is greater than the display width of the trajectory of the pointer.

9. An apparatus for evaluating time efficiency of a pointing device, comprising:

an image display unit;

a processor to display a graphic made of at least two sides not parallel to each other on a screen of said image display unit, each of the sides being a line segment having a width greater than a predetermined width; and an evaluation unit to display a trajectory of a pointer on said screen based on a movement of the pointer on said screen in accordance with data input from a pointing device, and to evaluate using whether the pointer has moved along each side of said graphic as an index, wherein the predetermined width is greater than the display width of the trajectory of the pointer.

10. An apparatus for evaluating real-time nature of a pointing device, comprising:

image display means;

processing means to display continuously on a screen of said image display means four target points disposed in a direction of a movement of a pointer by a pointing device having an operation unit to move the pointer in a plurality of directions on a screen of the image display means; and evaluation means to evaluate using time required for reaching said target point as an index based on the fact that the pointer has reached the target point on said screen in accordance with data input from said pointing device, wherein the four target points include a start target point and a final target point and two intermediate target points connecting the starting point to the final target point, each intermediate target point and final target point being disposed in either the up and down direction, the left and right direction, the upper left and lower right, or the upper right and lower left with respect to a immediately prior target point, such that a position of the final target point to the start target point is any one of positions toward the lower right, toward the lower left, toward the upper right and toward the upper left on the screen.

11. An apparatus for evaluating real-time nature of a pointing device according to claim 10, wherein said processing means displays a target point disposed correspondingly to a direction of a pointer moved by a pointing device having an operation unit to move the pointer in eight directions of up, down, left, right, upper left, lower left, upper right, and lower right.

12. An apparatus for evaluating real-time nature of a pointing device according to claim 11, wherein said processing means displays such that respective distances between said target points become equal to each other.

13. An apparatus for evaluating real-time nature of a pointing device according to claim 10, further comprising:

processing means to display a reached target point discriminatingly from a target point to be reached whenever a pointer has reached each of said target points.

14. A method for evaluating real-time nature of a pointing device comprising:

a first step of displaying continuously four target points disposed in a direction of a movement of a pointer by a pointing device having an operation unit to move the pointer in a plurality of directions on a screen of the image display means; and a second step of performing evaluation using time required for reaching said target point as an index based on the fact that the pointer has reached the target point on said screen in accordance with data input from said pointing device, wherein the four target points include a start target point and a final target point and two intermediate target points connecting the starting point to the final target point, each intermediate target point and final target point being disposed in either the up and down direction, the left and right direction, the upper left and lower right, or the upper right and lower left with respect to a immediately prior target point, such that a position of the final target point to the start target point is any one of positions toward the lower right, toward the lower left, toward the upper right and toward the upper left on the screen.

15. A non-transitory computer readable recording medium in which a program is recorded to make a computer execute the procedures of:

displaying continuously on a screen of image display means a plurality of target points disposed sequentially in a direction of a movement of a pointer by a pointing device having an operation unit to move the pointer in a plurality of directions on the screen of the image display means; and performing evaluation using time required for reaching said target point as an index based on the fact that the pointer has reached the target point on said screen in accordance with data input from said pointing device, wherein the four target points include a start target point and a final target point and two intermediate target points connecting the starting point to the final target point, each intermediate target point and final target point being disposed in either the up and down direction, the left and right direction, the upper left and lower right, or the upper right and lower left with respect to a immediately prior target point, such that a position of the final target point to the start target point is any one of positions toward the lower right, toward the lower left, toward the upper right and toward the upper left on the screen.

16. An apparatus for evaluating real-time nature of a pointing device, comprising:

an image display unit;

a processing unit to display continuously on a screen of said image display unit a target point disposed in a direction of a movement of a pointer by a pointing device having an operation unit to move the pointer in a plurality of directions on a screen of the image display unit; and an evaluation unit to evaluate using time required for reaching said target point as an index based on the fact that the pointer has reached the target point on said screen in accordance with data input from said pointing device, wherein the four target points include a start target point and a final target point and two intermediate target points connecting the starting point to the final target point, each intermediate target point and final target point being disposed in either the up and down direction, the left and right direction, the upper left and lower right, or the upper right and lower left with respect to a immediately prior target point, such that a position of the final target point to the start target point is any one of positions toward the lower right, toward the lower left, toward the upper right and toward the upper left on the screen.

* * * * *